US010951347B2

(12) United States Patent
Santhanam et al.

(10) Patent No.: US 10,951,347 B2
(45) Date of Patent: Mar. 16, 2021

(54) USER EQUIPMENT CAPABILITY DISCOVERY IN DISTRIBUTED WIRELESS NETWORKS

(71) Applicant: QUALCOMM Incorporated, San Diego, CA (US)

(72) Inventors: Arvind Vardarajan Santhanam, San Diego, CA (US); Sudhir Kumar Baghel, Hillsborough, NJ (US); Kapil Gulati, Dover, DE (US); Shailesh Patil, San Diego, CA (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/018,478

(22) Filed: Jun. 26, 2018

(65) Prior Publication Data

US 2019/0020440 A1  Jan. 17, 2019

Related U.S. Application Data

(60) Provisional application No. 62/531,691, filed on Jul. 12, 2017.

(51) Int. Cl.
*H04L 29/06* (2006.01)
*H04W 4/40* (2018.01)
(Continued)

(52) U.S. Cl.
CPC .............. *H04L 1/0003* (2013.01); *H04L 1/04* (2013.01); *H04L 1/0643* (2013.01);
(Continued)

(58) Field of Classification Search
CPC . H04L 1/0003; H04L 1/04; H04L 1/06; H04L 1/16; H04L 12/189; H04L 69/24;
(Continued)

(56) References Cited

U.S. PATENT DOCUMENTS

2014/0112309 A1  4/2014  Kwon et al.
2015/0271732 A1  9/2015  Grandhi
(Continued)

FOREIGN PATENT DOCUMENTS

EP  3128797 A1  2/2017
WO  WO-2016022935 A1  2/2016
(Continued)

OTHER PUBLICATIONS

International Search Report and Written Opinion—PCT/US2018/039682—ISA/EPO—dated Nov. 9, 2018.
(Continued)

*Primary Examiner* — Kent Krueger
(74) *Attorney, Agent, or Firm* — Holland & Hart LLP

(57) ABSTRACT

Advertising wireless devices (e.g., user equipments (UEs)) within a distributed wireless network may indicate radio frequency and/or baseband capabilities (e.g., via transmitting capabilities messages). A responding UE may receive one or more capabilities messages, and identify radio frequency (RF) capabilities (e.g., indicated via a bitmap) and/or baseband capabilities of the advertising UEs. The responding UE may then determine a transmission scheduling policy based on the one or more received capabilities messages. For example, the responding UE may generate a combined list of frequencies based on the one or more received capabilities messages, and distribute transmissions over the list of frequencies. Additionally or alternatively, the responding UE may determine block decoding baseband capabilities of the one or more advertising UEs, and may accordingly enable block coding schemes for transmissions on frequencies supported by the advertising UEs with such block decoding baseband capabilities.

30 Claims, 16 Drawing Sheets

(51) Int. Cl.
| | |
|---|---|
| H04L 1/00 | (2006.01) |
| H04L 12/18 | (2006.01) |
| H04L 1/04 | (2006.01) |
| H04W 74/00 | (2009.01) |
| H04L 1/06 | (2006.01) |
| H04W 8/00 | (2009.01) |
| H04W 4/70 | (2018.01) |
| H04L 1/16 | (2006.01) |
| H04W 88/04 | (2009.01) |
| H04W 4/06 | (2009.01) |
| H04W 84/18 | (2009.01) |
| H04W 8/24 | (2009.01) |

(52) U.S. Cl.
CPC .......... *H04L 1/0675* (2013.01); *H04L 1/1614* (2013.01); *H04L 12/189* (2013.01); *H04L 69/24* (2013.01); *H04W 4/40* (2018.02); *H04W 4/70* (2018.02); *H04W 8/005* (2013.01); *H04W 74/002* (2013.01); *H04W 4/06* (2013.01); *H04W 8/24* (2013.01); *H04W 84/18* (2013.01); *H04W 88/04* (2013.01)

(58) Field of Classification Search
CPC .......... H04W 4/70; H04W 4/40; H04W 4/06; H04W 8/005; H04W 8/24; H04W 74/002; H04W 84/18; H04W 88/04
See application file for complete search history.

(56) References Cited

U.S. PATENT DOCUMENTS

| | | | |
|---|---|---|---|
| 2016/0050698 | A1 | 2/2016 | Siomina |
| 2016/0142898 | A1 | 5/2016 | Poitau et al. |
| 2019/0020381 | A1* | 1/2019 | Tooher .................. H04B 7/026 |
| 2019/0357025 | A1* | 11/2019 | Hwang .................. H04W 4/40 |

FOREIGN PATENT DOCUMENTS

| | | |
|---|---|---|
| WO | WO-2017117253 A1 | 7/2017 |
| WO | WO-2018136195 A1 | 7/2018 |

OTHER PUBLICATIONS

Partial International Search Report—PCT/US2018/039682—ISA/EPO—dated Sep. 12, 2018.
ZTE: "On D2D UE Capability, D2D Interest and Prioritization", 3GPP TSG-RAN WG2#87 R2-143596, 3GPP, Aug. 9, 2014, 7 Pages.

* cited by examiner

US 10,951,347 B2

USER EQUIPMENT CAPABILITY DISCOVERY IN DISTRIBUTED WIRELESS NETWORKS

CROSS REFERENCES

The present Application for Patent claims the benefit of U.S. Provisional Patent Application No. 62/531,691 by Santhanam, et al., entitled "User Equipment Capability Discovery in Distributed Wireless Networks," filed Jul. 12, 2017, assigned to the assignee hereof, and expressly incorporated herein by reference in its entirety.

INTRODUCTION

The following relates generally to wireless communication, and more specifically to techniques for user equipment (UE) capability discovery in distributed wireless networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as UEs.

In some wireless communications systems, such as distributed wireless networks, wireless devices (e.g., UEs) that communicate with each other may support various radio frequency and/or baseband capabilities. That is, in some distributed wireless networks, UEs within the network may operate over different transmission and/or reception frequencies, and may support different block decoding schemes. In some cases, a transmitting UE and a receiving UE may have different capabilities. For example, a UE may transmit over a frequency not monitored by a UE intended for reception (e.g., if the UE intended for reception does not support reception over the frequency). Additionally or alternatively, a UE may transmit using a block coding scheme not supported by a UE intended for reception. Such scenarios may result in decreased system performance (e.g., due to reception failures) and, in some cases, inefficient resource utilization (e.g., due to retransmissions, additional transmissions over other frequencies not supported by the intended UE, etc.). Improved techniques for UE capability discovery in distributed wireless networks may thus be desired.

SUMMARY

A method of wireless communication in a distributed wireless network is described. The method may include generating, at a first wireless device in the distributed wireless network, a capabilities message with a list of frequencies supported by the first wireless device, transmitting the capabilities message to one or more second wireless devices of the distributed wireless network, and receiving a broadcast message from at least one of the one or more second wireless devices based at least in part on the transmitted capabilities message.

An apparatus for wireless communication in a distributed wireless network is described. The apparatus may include means for generating, at a first wireless device in the distributed wireless network, a capabilities message with a list of frequencies supported by the first wireless device, means for transmitting the capabilities message to one or more second wireless devices of the distributed wireless network, and means for receiving a broadcast message from at least one of the one or more second wireless devices based at least in part on the transmitted capabilities message.

Another apparatus for wireless communication in a distributed wireless network is described. The apparatus may include a processor, memory in electronic communication with the processor, and instructions stored in the memory. The instructions may be operable to cause the processor to generate, at a first wireless device in the distributed wireless network, a capabilities message with a list of frequencies supported by the first wireless device, transmit the capabilities message to one or more second wireless devices of the distributed wireless network, and receive a broadcast message from at least one of the one or more second wireless devices based at least in part on the transmitted capabilities message.

A non-transitory computer readable medium for wireless communication in a distributed wireless network is described. The non-transitory computer-readable medium may include instructions operable to cause a processor to generate, at a first wireless device in the distributed wireless network, a capabilities message with a list of frequencies supported by the first wireless device, transmit the capabilities message to one or more second wireless devices of the distributed wireless network, and receive a broadcast message from at least one of the one or more second wireless devices based at least in part on the transmitted capabilities message.

Some examples of the method, apparatus, and non-transitory computer-readable medium described above may further include processes, features, means, or instructions for generating a bitmap of the list of frequencies based at least in part on the frequency capabilities of the first wireless device. Some examples of the method, apparatus, and non-transitory computer-readable medium described above may further include processes, features, means, or instructions for generating the capabilities message based at least in part on the bitmap.

In some examples of the method, apparatus, and non-transitory computer-readable medium described above, the list of frequencies includes frequencies on which the first wireless device may be configured to simultaneously support receipt of communications in the distributed wireless network. In some examples of the method, apparatus, and non-transitory computer-readable medium described above, the list of frequencies includes frequencies on which the first wireless device may be listening for communications in the distributed wireless network. In some examples of the method, apparatus, and non-transitory computer-readable medium described above, the capabilities message may be transmitted via a sidelink control information (SCI) message.

In some examples of the method, apparatus, and non-transitory computer-readable medium described above, a modulation and coding scheme (MCS) used in relation to the SCI message varies based on a size of the SCI message. In some examples of the method, apparatus, and non-transitory computer-readable medium described above, the capabilities message may be transmitted via a vehicle-to-everything (V2X) message payload, via a Packet Data Convergence Protocol (PDCP) header extension, via a media access control (MAC) payload, as advertised by a metadata bit included in a SCI message, or via combinations thereof.

In some examples of the method, apparatus, and non-transitory computer-readable medium described above, generating the capabilities message may further include encoding the capabilities message with baseband capabilities supported by the first wireless device. Some examples of the method, apparatus, and non-transitory computer-readable medium described above may further include processes, features, means, or instructions for receiving the broadcast message from the at least one of the one or more second wireless devices based at least in part on the baseband capabilities.

In some examples of the method, apparatus, and non-transitory computer-readable medium described above, the baseband capabilities may include a space time block code (STBC) scheme or a space frequency block code (SFBC) scheme.

In some examples of the method, apparatus, and non-transitory computer-readable medium described above, generating the capabilities message may further comprise including an indication of whether frequency capabilities information or baseband capabilities information of the first wireless device, as included in the capabilities message, may be static or dynamic.

In some examples of the method, apparatus, and non-transitory computer-readable medium described above, the capabilities message may be transmitted periodically.

In some examples of the method, apparatus, and non-transitory computer-readable medium described above, the distributed wireless network supports V2X communications, public safety device-to-device (D2D) communications, peer-to-peer (P2P) communications, or combinations thereof.

A method of wireless communication in a distributed wireless network is described. The method may include identifying, at a first wireless device of the distributed wireless network, at least one of a combined list of frequencies on which a plurality of second wireless devices are configured to receive communications in the distributed wireless network or a combined list of baseband capabilities of the plurality of second wireless devices in the distributed wireless network, determining a transmission scheduling policy based at least in part on the combined list of frequencies or the combined list of baseband capabilities, and transmitting a broadcast message to respective second wireless devices of the plurality of second wireless devices in accordance with the transmission scheduling policy.

An apparatus for wireless communication in a distributed wireless network is described. The apparatus may include means for identifying, at a first wireless device of the distributed wireless network, at least one of a combined list of frequencies on which a plurality of second wireless devices are configured to receive communications in the distributed wireless network or a combined list of baseband capabilities of the plurality of second wireless devices in the distributed wireless network, means for determining a transmission scheduling policy based at least in part on the combined list of frequencies or the combined list of baseband capabilities, and means for transmitting a broadcast message to respective second wireless devices of the plurality of second wireless devices in accordance with the transmission scheduling policy.

Another apparatus for wireless communication in a distributed wireless network is described. The apparatus may include a processor, memory in electronic communication with the processor, and instructions stored in the memory. The instructions may be operable to cause the processor to identify, at a first wireless device of the distributed wireless network, at least one of a combined list of frequencies on which a plurality of second wireless devices are configured to receive communications in the distributed wireless network or a combined list of baseband capabilities of the plurality of second wireless devices in the distributed wireless network, determine a transmission scheduling policy based at least in part on the combined list of frequencies or the combined list of baseband capabilities, and transmit a broadcast message to respective second wireless devices of the plurality of second wireless devices in accordance with the transmission scheduling policy.

A non-transitory computer readable medium for wireless communication in a distributed wireless network is described. The non-transitory computer-readable medium may include instructions operable to cause a processor to identify, at a first wireless device of the distributed wireless network, at least one of a combined list of frequencies on which a plurality of second wireless devices are configured to receive communications in the distributed wireless network or a combined list of baseband capabilities of the plurality of second wireless devices in the distributed wireless network, determine a transmission scheduling policy based at least in part on the combined list of frequencies or the combined list of baseband capabilities, and transmit a broadcast message to respective second wireless devices of the plurality of second wireless devices in accordance with the transmission scheduling policy.

In some examples of the method, apparatus, and non-transitory computer-readable medium described above, identifying at least one of the combined list of frequencies or the combined list of baseband capabilities of the plurality of second wireless devices in the distributed wireless network includes receiving one or more capabilities messages from the respective second wireless devices of the plurality of second wireless devices. Some examples of the method, apparatus, and non-transitory computer-readable medium described above may further include processes, features, means, or instructions for generating at least one of the combined list of frequencies based at least in part on individual lists of frequencies included in the one or more capabilities messages or the combined list of baseband capabilities based at least in part on individual lists of baseband capabilities included in the one or more capabilities messages, each individual list of frequencies identifying frequencies on which the respective second wireless devices are configured to receive communications in the distributed wireless network and each individual list of baseband capabilities identifying baseband capabilities of the respective second wireless devices.

In some examples of the method, apparatus, and non-transitory computer-readable medium described above, determining the transmission scheduling policy may further include determining that a majority of neighboring second wireless devices of the plurality of second wireless devices are configured to listen to only a single frequency band. Some examples of the method, apparatus, and non-transitory computer-readable medium described above may further include processes, features, means, or instructions for distributing transmissions based at least in part on a bias for the single frequency band.

In some examples of the method, apparatus, and non-transitory computer-readable medium described above, determining the transmission scheduling policy may further include determining that a threshold percentage of neighboring respective second wireless devices of the plurality of second wireless devices have block decoding baseband capabilities, and enabling a block coding scheme for transmissions on frequencies that are supported by the threshold percentage of neighboring respective second wireless devices, where the block coding scheme includes a space time block code (STBC) scheme or a space frequency block code (SFBC) scheme.

A method of wireless communication in a distributed wireless network is described. The method may include identifying, at a first wireless device of the distributed wireless network, a combined list of frequencies on which a plurality of second wireless devices are configured to receive communications in the distributed wireless network, determining a transmission scheduling policy based at least in part on the combined list of frequencies, and transmitting a broadcast message in accordance with the transmission scheduling policy.

An apparatus for wireless communication in a distributed wireless network is described. The apparatus may include means for identifying, at a first wireless device of the distributed wireless network, a combined list of frequencies on which a plurality of second wireless devices are configured to receive communications in the distributed wireless network, means for determining a transmission scheduling policy based at least in part on the combined list of frequencies, and means for transmitting a broadcast message in accordance with the transmission scheduling policy.

Another apparatus for wireless communication in a distributed wireless network is described. The apparatus may include a processor, memory in electronic communication with the processor, and instructions stored in the memory. The instructions may be operable to cause the processor to identify, at a first wireless device of the distributed wireless network, a combined list of frequencies on which a plurality of second wireless devices are configured to receive communications in the distributed wireless network, determine a transmission scheduling policy based at least in part on the combined list of frequencies, and transmit a broadcast message in accordance with the transmission scheduling policy.

A non-transitory computer readable medium for wireless communication in a distributed wireless network is described. The non-transitory computer-readable medium may include instructions operable to cause a processor to identify, at a first wireless device of the distributed wireless network, a combined list of frequencies on which a plurality of second wireless devices are configured to receive communications in the distributed wireless network, determine a transmission scheduling policy based at least in part on the combined list of frequencies, and transmit a broadcast message in accordance with the transmission scheduling policy.

In some examples of the method, apparatus, and non-transitory computer-readable medium described above, identifying the combined list of frequencies on which the plurality of second wireless devices may be configured to receive communications in the distributed wireless network may include receiving one or more capabilities messages from respective second wireless devices of the plurality of second wireless devices. Some examples of the method, apparatus, and non-transitory computer-readable medium described above may further include processes, features, means, or instructions for generating the combined list of frequencies based at least in part on individual lists of frequencies included in the one or more capabilities messages, each individual list of frequencies identifying frequencies on which the respective second wireless devices may be configured to receive communications in the distributed wireless network.

In some examples of the method, apparatus, and non-transitory computer-readable medium described above, determining the transmission scheduling policy may further include determining that a majority of neighboring second wireless devices of the plurality of second wireless devices may be configured to listen to only a single frequency band. Some examples of the method, apparatus, and non-transitory computer-readable medium described above may further include processes, features, means, or instructions for distributing transmissions based at least in part on a bias for the single frequency band.

In some examples of the method, apparatus, and non-transitory computer-readable medium described above, determining the transmission scheduling policy may further include determining that a majority of neighboring second wireless devices of the plurality of second wireless devices may be configured to listen to a limited number of frequency bands. Some examples of the method, apparatus, and non-transitory computer-readable medium described above may further include processes, features, means, or instructions for distributing transmissions based at least in part on a bias for frequency bands of the limited number of frequency bands that may be most commonly used by the neighboring second wireless devices.

In some examples of the method, apparatus, and non-transitory computer-readable medium described above, determining the transmission scheduling policy may further include determining a primary frequency, a carrier aggregation scheme, or some combination thereof based at least in part on the combined list of frequencies. Some examples of the method, apparatus, and non-transitory computer-readable medium described above may further include processes, features, means, or instructions for determining the transmission scheduling policy based at least in part on the primary frequency, the carrier aggregation scheme, or some combination thereof.

In some examples of the method, apparatus, and non-transitory computer-readable medium described above, the distributed wireless network supports V2X communications, public safety D2D communications, P2P communications, or combinations thereof.

A method of wireless communication in a distributed wireless network is described. The method may include identifying, at a first wireless device in the distributed wireless network, a combined list of baseband capabilities of a plurality of second wireless devices in the distributed wireless network, determining a transmission scheduling policy based at least in part on the combined list of baseband capabilities, and transmitting a broadcast message to the respective second wireless devices in accordance with the transmission scheduling policy.

An apparatus for wireless communication in a distributed wireless network is described. The apparatus may include means for identifying, at a first wireless device in the distributed wireless network, a combined list of baseband capabilities of a plurality of second wireless devices in the distributed wireless network, means for determining a transmission scheduling policy based at least in part on the combined list of baseband capabilities, and means for transmitting a broadcast message to the respective second wireless devices in accordance with the transmission scheduling policy.

Another apparatus for wireless communication in a distributed wireless network is described. The apparatus may include a processor, memory in electronic communication with the processor, and instructions stored in the memory. The instructions may be operable to cause the processor to identify, at a first wireless device in the distributed wireless network, a combined list of baseband capabilities of a plurality of second wireless devices in the distributed wireless network, determine a transmission scheduling policy based at least in part on the combined list of baseband capabilities, and transmit a broadcast message to the respective second wireless devices in accordance with the transmission scheduling policy.

A non-transitory computer readable medium for wireless communication in a distributed wireless network is described. The non-transitory computer-readable medium may include instructions operable to cause a processor to identify, at a first wireless device in the distributed wireless network, a combined list of baseband capabilities of a plurality of second wireless devices in the distributed wireless network, determine a transmission scheduling policy based at least in part on the combined list of baseband capabilities, and transmit a broadcast message to the respective second wireless devices in accordance with the transmission scheduling policy.

In some examples of the method, apparatus, and non-transitory computer-readable medium described above, identifying the combined list of baseband capabilities of a plurality of second wireless devices in the distributed wireless network may include receiving one or more capabilities messages from respective second wireless devices of the plurality of second wireless devices. Some examples of the method, apparatus, and non-transitory computer-readable medium described above may further include processes, features, means, or instructions for generating the combined list of baseband capabilities based at least in part on individual lists of baseband capabilities included in the one or more capabilities messages, each individual list of baseband capabilities identifying baseband capabilities of the respective second wireless devices.

In some examples of the method, apparatus, and non-transitory computer-readable medium described above, determining the transmission scheduling policy may further include determining that a predetermined percentage of neighboring respective second wireless devices of the plurality of second wireless devices may have block decoding baseband capabilities. Some examples of the method, apparatus, and non-transitory computer-readable medium described above may further include processes, features, means, or instructions for enabling a block coding scheme for transmissions on frequencies that may be supported by the predetermined percentage of neighboring respective second wireless devices.

In some examples of the method, apparatus, and non-transitory computer-readable medium described above, the block coding scheme may include a STBC scheme or a SFBC scheme.

In some examples of the method, apparatus, and non-transitory computer-readable medium described above, the distributed wireless network supports V2X communications, public safety D2D communications, P2P communications, or combinations thereof.

A method of wireless communication in a distributed wireless network is described. The method may include receiving, at a first wireless device in the distributed wireless network, one or more capabilities messages from respective second wireless devices in the distributed wireless network, each of the one or more capabilities messages including a list of frequencies supported by the respective second wireless devices, identifying, based at least in part on the one or more capabilities messages, a combined list of frequencies on which the respective second wireless devices are collectively configured to receive communications in the distributed wireless network, and transmitting a broadcast message to the respective second wireless devices using at least a subset of frequencies included in the combined list of frequencies.

An apparatus for wireless communication in a distributed wireless network is described. The apparatus may include means for receiving, at a first wireless device in the distributed wireless network, one or more capabilities messages from respective second wireless devices in the distributed wireless network, each of the one or more capabilities messages including a list of frequencies supported by the respective second wireless devices, means for identifying, based at least in part on the one or more capabilities messages, a combined list of frequencies on which the respective second wireless devices are collectively configured to receive communications in the distributed wireless network, and means for transmitting a broadcast message to the respective second wireless devices using at least a subset of frequencies included in the combined list of frequencies.

Another apparatus for wireless communication in a distributed wireless network is described. The apparatus may include a processor, memory in electronic communication with the processor, and instructions stored in the memory. The instructions may be operable to cause the processor to receive, at a first wireless device in the distributed wireless network, one or more capabilities messages from respective second wireless devices in the distributed wireless network, each of the one or more capabilities messages including a list of frequencies supported by the respective second wireless devices, identify, based at least in part on the one or more capabilities messages, a combined list of frequencies on which the respective second wireless devices are collectively configured to receive communications in the distributed wireless network, and transmit a broadcast message to the respective second wireless devices using at least a subset of frequencies included in the combined list of frequencies.

A non-transitory computer readable medium for wireless communication in a distributed wireless network is described. The non-transitory computer-readable medium may include instructions operable to cause a processor to receive, at a first wireless device in the distributed wireless network, one or more capabilities messages from respective second wireless devices in the distributed wireless network, each of the one or more capabilities messages including a list of frequencies supported by the respective second wireless devices, identify, based at least in part on the one or more capabilities messages, a combined list of frequencies on which the respective second wireless devices are collectively configured to receive communications in the distributed wireless network, and transmit a broadcast message to the respective second wireless devices using at least a subset of frequencies included in the combined list of frequencies.

In some examples of the method, apparatus, and non-transitory computer-readable medium described above, identifying the combined list of frequencies on which the respective second wireless devices may be collectively configured to receive communications in the distributed wireless network may include identifying the combined list of frequencies via a bitmap included in each of the one or more capabilities messages.

In some examples of the method, apparatus, and non-transitory computer-readable medium described above, the combined list of frequencies includes frequencies on which the respective second wireless devices may be configured to simultaneously support receipt of communications in the distributed wireless network.

In some examples of the method, apparatus, and non-transitory computer-readable medium described above, the combined list of frequencies includes frequencies on which the respective second wireless devices may be listening for communications in the distributed wireless network.

Some examples of the method, apparatus, and non-transitory computer-readable medium described above may further include processes, features, means, or instructions for identifying, based at least in part on the one or more capabilities messages, a list of frequencies on which the respective second wireless devices may be configured to transmit communications in the distributed wireless network.

In some examples of the method, apparatus, and non-transitory computer-readable medium described above, receiving the one or more capabilities messages from the respective second wireless devices may include receiving the one or more capabilities messages via a SCI message.

In some examples of the method, apparatus, and non-transitory computer-readable medium described above, a MCS used in relation to the SCI message varies based on a size of the SCI message.

In some examples of the method, apparatus, and non-transitory computer-readable medium described above, receiving the one or more capabilities messages from the respective second wireless devices may include receiving the one or more capabilities messages via a V2X message payload, via a PDCP header extension, via a MAC payload, as advertised by a metadata bit included in a SCI message, or via combinations thereof.

In some examples of the method, apparatus, and non-transitory computer-readable medium described above, the one or more capabilities messages include an indication of whether frequency capabilities information or baseband capabilities information of the respective second wireless devices, as included in the one or more capabilities message, may be static or dynamic.

Some examples of the method, apparatus, and non-transitory computer-readable medium described above may further include processes, features, means, or instructions for determining a transmission scheduling policy based at least in part on the combined list of frequencies. Some examples of the method, apparatus, and non-transitory computer-readable medium described above may further include processes, features, means, or instructions for transmitting the broadcast message to the respective second wireless devices in accordance with the transmission scheduling policy.

In some examples of the method, apparatus, and non-transitory computer-readable medium described above, determining the transmission scheduling policy may further include determining that a majority of neighboring respective second wireless devices in the distributed wireless network may be configured to listen to only a single frequency band. Some examples of the method, apparatus, and non-transitory computer-readable medium described above may further include processes, features, means, or instructions for distributing transmissions based at least in part on a bias for the single frequency band.

In some examples of the method, apparatus, and non-transitory computer-readable medium described above, determining the transmission scheduling policy may further include determining that a majority of neighboring respective second wireless devices in the distributed wireless network may be configured to listen to a limited number of frequency bands. Some examples of the method, apparatus, and non-transitory computer-readable medium described above may further include processes, features, means, or instructions for distributing transmissions based at least in part on a bias for frequency bands of the limited number of frequency bands that may be most commonly used by the neighboring respective second wireless devices.

In some examples of the method, apparatus, and non-transitory computer-readable medium described above, determining the transmission scheduling policy may further include determining a primary frequency, a carrier aggregation scheme, or some combination thereof based at least in part on the one or more frequencies. Some examples of the method, apparatus, and non-transitory computer-readable medium described above may further include processes, features, means, or instructions for determining the transmission scheduling policy based at least in part on the primary frequency, the carrier aggregation scheme, or some combination thereof.

Some examples of the method, apparatus, and non-transitory computer-readable medium described above may further include processes, features, means, or instructions for identifying, based at least in part on the capabilities message, baseband capabilities of the respective second wireless devices within the distributed wireless network. Some examples of the method, apparatus, and non-transitory computer-readable medium described above may further include processes, features, means, or instructions for determining a transmission scheduling policy based at least in part on the baseband capabilities of the respective second wireless devices.

In some examples of the method, apparatus, and non-transitory computer-readable medium described above, determining the transmission scheduling policy may further include determining that a predetermined percentage of neighboring respective second wireless devices in the distributed wireless network may have block decoding baseband capabilities. Some examples of the method, apparatus, and non-transitory computer-readable medium described above may further include processes, features, means, or instructions for enabling a block coding scheme for transmissions on frequencies that may be supported by the predetermined percentage of neighboring respective second wireless devices.

In some examples of the method, apparatus, and non-transitory computer-readable medium described above, the block coding scheme includes a STBC scheme or a SFBC scheme.

In some examples of the method, apparatus, and non-transitory computer-readable medium described above, the distributed wireless network supports V2X communications, public safety D2D communications, P2P communications, or combinations thereof.

DETAILED DESCRIPTION

Figure 1:
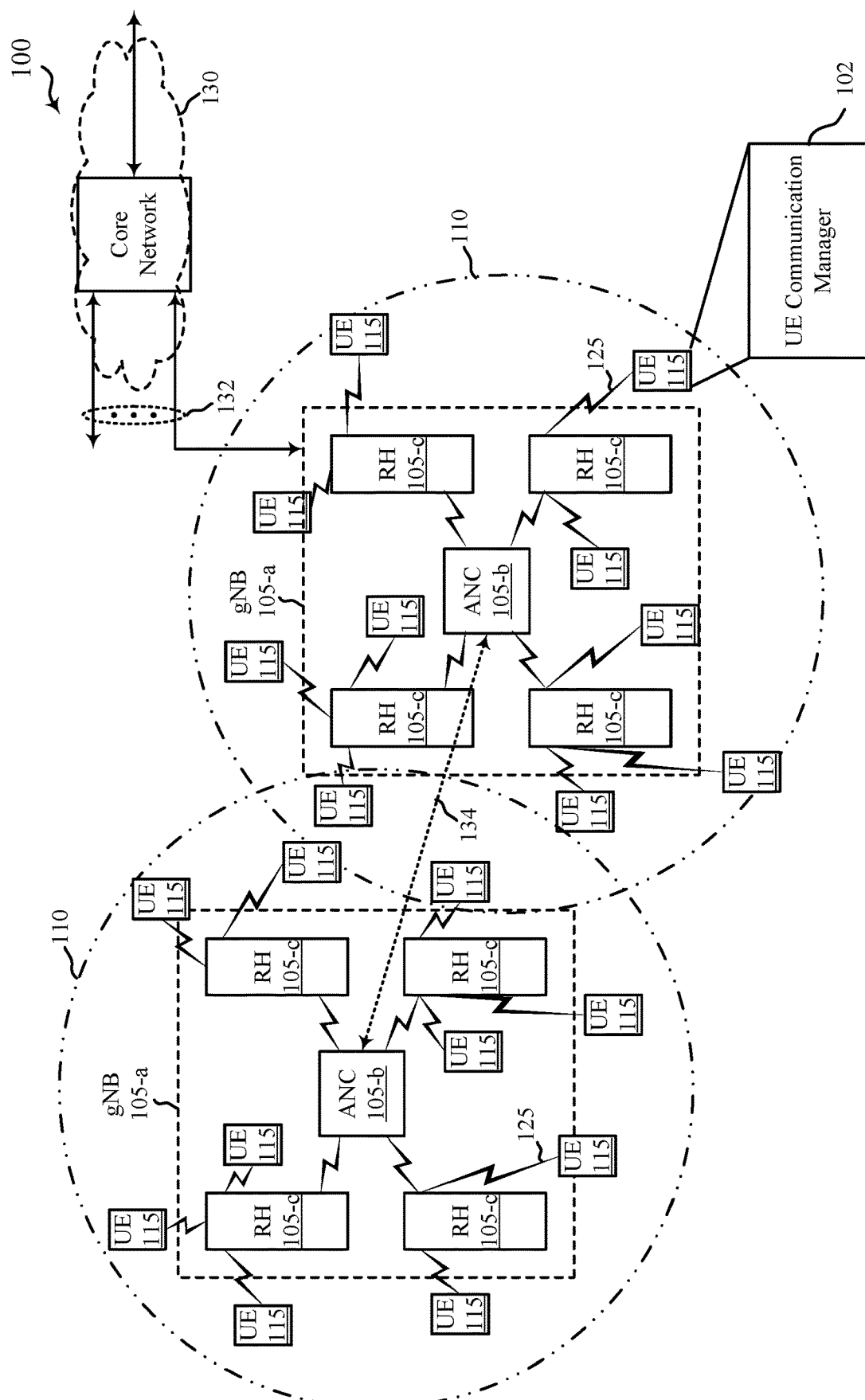
FIG. 1 illustrates an example of a system for wireless communication that supports techniques for UE capability discovery in distributed wireless networks in accordance with one or more aspects of the present disclosure.

In some distributed wireless networks, wireless devices (e.g., UEs) within the network may operate over different transmission and/or reception frequencies, and may support different block decoding schemes. In some cases, a UE may transmit over a frequency not monitored by a UE intended for reception (e.g., if the UE intended for reception does not support reception over the frequency). Additionally or alternatively, a UE may transmit using a block coding scheme not supported by a UE intended for reception. Such scenarios may result in decreased system performance (e.g., due to reception failures) and, in some cases, inefficient resource utilization (e.g., due to retransmissions, additional transmissions over other frequencies not supported by the intended UE, etc.).

For example, UEs within a distributed wireless network may not be aware of each other's capabilities in terms of which frequencies are being used for transmission and reception by other UEs. UEs that select a single frequency for transmission may not be able to effectively communicate with UEs intended for reception that are monitoring other frequencies. UEs that transmit over multiple frequencies (e.g., over many or all frequencies supported for transmission) may transmit over a combination of frequencies that are and are not monitored, resulting in poor resource utilization. Alternatively, transmission over a single or default frequency may result in system latency due to transmission crowding on the frequency. In some cases, while mapping one V2X service to one frequency may be beneficial in a lightly loaded condition, such mapping may limit an ability to transmit Provider Service Identifiers (PSIDs) across two frequencies. Further, UEs within the distributed wireless network may support different block decoding capabilities, such that use of certain coding schemes for all transmissions may not be efficient.

As such, UEs within a distributed wireless network (e.g., advertising UEs) may indicate radio frequency (RF) and/or baseband capabilities (e.g., via transmission of a capabilities message from an advertising UE to a responding UE). An advertising UE may transmit one or more capabilities messages. The one or more capabilities messages may be indicative of RF capabilities and/or baseband capabilities of the advertising UE. A transmitting UE (e.g., a responding UE) may receive the one or more capabilities messages and identify RF capabilities and/or baseband capabilities of the advertising UEs. The responding UE may then determine a transmission scheduling policy based on the one or more received capabilities messages. For example, the responding UE may generate a combined list of frequencies based on the one or more received capabilities messages, and distribute transmissions over the list of frequencies (e.g., broadcast transmissions based on the list of frequencies). Additionally or alternatively, the responding UE may determine block decoding baseband capabilities of the one or more advertising UEs, and may accordingly enable block coding schemes for transmissions on frequencies supported by the advertising UEs with such block decoding baseband capabilities. Therefore, a transmitting UE (e.g., a responding UE) may optimize transmission scheduling to various other UEs (e.g., associated with different RF and/or baseband capabilities) within a distributed wireless network. Implementation of such techniques may result in more efficient resource utilization and increased system performance (e.g., due to more efficient block coding scheme utilization, etc.).

Aspects of the disclosure are initially described in the context of a wireless communications system. Examples of distributed wireless networks and process flows implementing discussed UE capability discovery techniques are then described. Aspects of the disclosure are further illustrated by and described with reference to apparatus diagrams, system diagrams, and flowcharts that relate to techniques for UE capability discovery in distributed wireless networks.

FIG. 1 illustrates an example of a wireless communications system 100 in accordance with one or more aspects of the present disclosure. The wireless communications system 100 includes base stations 105 (e.g., new generation NodeBs, gNodeBs (gNBs) 105-a, and/or radio heads (RHs) 105-c), UEs 115, and a core network 130. In some examples, the wireless communications system 100 may be an LTE, LTE-Advanced (LTE-A) network, or a NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

UEs 115 may include a communications manager 102, which may execute techniques for UE capability discovery in distributed wireless networks (e.g., wireless communications system 100). The UE capability discovery techniques may include advertising of RF and/or baseband capabilities via one or more capabilities messages. Techniques may also include determining transmission scheduling policies based on received capabilities messages. As discussed herein, communications manager 102 may implement such techniques. For example, communications manager 102, when included in an advertising UE 115, may generate capabilities messages for advertisement by the UE 115. Additionally or alternatively, communications manager 102 may, when included in a responding UE 115, determine a transmission scheduling policy based on any capabilities messages received by the UE 115 (e.g., from other UEs 115 within range). For example, communication manager 102 may determine the transmission scheduling policy based on either a combined list of frequencies on which a plurality of second wireless devices are configured to receive communications in the distributed wireless network or a combined list of baseband capabilities of the plurality of second wireless devices in the distributed wireless network. In some examples, communication manager 102 may determine the transmission scheduling policy based on both the combined list of frequencies on which the plurality of second wireless devices are configured to receive communications in the distributed wireless network and the combined list of baseband capabilities of the plurality of second wireless devices in the distributed wireless network.

Wireless communications system 100 may operate in an ultra-high frequency (UHF) region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or a UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or a base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
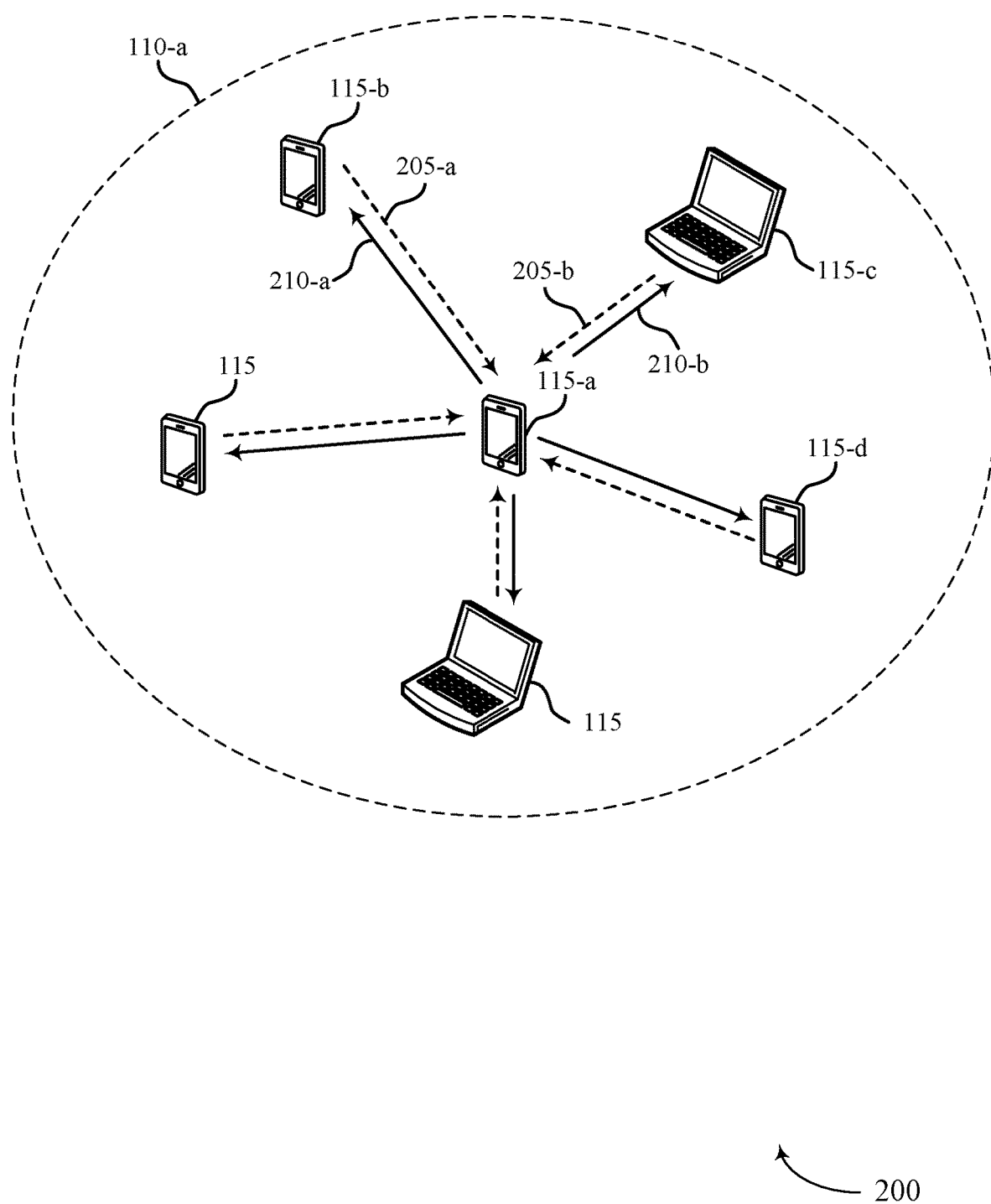
FIG. 2 illustrates an example of a distributed wireless network that supports techniques for UE capability discovery in accordance with one or more aspects of the present disclosure.

FIG. 2 illustrates an example of a distributed wireless network 200 that supports techniques for UE capability discovery in accordance with one or more aspects of the present disclosure. In some examples, distributed wireless network 200 may implement aspects of wireless communications system 100. Distributed wireless network 200 may include UE 115-a, UE 115-b, UE 115-c, and UE 115-d which may be examples of the UEs 115 described with reference to FIG. 1. The UEs 115 of the distributed wireless network 200 may be associated with a number of different entities. According to techniques described herein, advertising UEs (e.g., UE 115-b, UE 115-c, and UE 115-d) may transmit capability messages 205 and may receive broadcast messages 210 (e.g., from responding UE 115-a), as discussed in more detail below. A UE 115 may act as an advertising UE and/or a responding UE. For example, an advertising UE 115 may refer to a UE that is advertising capability information (e.g., capabilities messages) and a responding UE 115 may refer to a UE that responds to a received capability message, or a UE that intends to transmit and takes previously received capability information into account (e.g., received from advertising UEs 115).

For example, distributed wireless network 200 may include multiple advertising UEs (e.g., UE 115-b, UE 115-c, and UE 115-d), which may advertise or communicate capabilities to a responding UE (e.g., UE 115-a). Specifically, advertising UEs 115 within a distributed wireless network may indicate RF and/or baseband capabilities (e.g., via transmitting capabilities messages 205). A responding UE 115-a may receive one or more capabilities messages 205, and identify RF capabilities (e.g., indicated via a bitmap in a capabilities message) and/or baseband capabilities of the advertising UEs 115. That is, UE 115-a may discover the capabilities of all neighboring UEs 115 (e.g., UEs 115 within the coverage area 110-a of UE 115-a).

The responding UE 115-a may then determine a transmission scheduling policy based on the one or more received capabilities messages 205. For example, the responding UE 115-a may generate a combined list of frequencies based on the content of capabilities message 205-a, capabilities message 205-b, etc., and distribute transmissions over the list of frequencies. Additionally or alternatively, the UE 115-a may determine block decoding baseband capabilities of the one or more advertising UEs 115, and may accordingly enable block coding schemes for transmissions on frequencies supported by the advertising UEs 115 with such block decoding baseband capabilities. For example, if UE 115-c supports space time block code (STBC), UE 115-a may determine a transmission scheduling policy such that STBC is enabled on frequency bands indicated by capabilities message 205-b for transmission of broadcast message 210-b.

UEs 115 within distributed wireless network 200 may support one or more frequencies for transmitting messages. UEs 115 within distributed wireless network 200 may also support one or more frequencies for receiving messages. Further, UEs 115 within distributed wireless network 200 may be able to simultaneously (e.g., at the same time or within a single transmission time interval) demodulate signals on one or more frequencies (e.g., receive messages simultaneously over one or more frequencies). UEs 115 may additionally have different block decoding baseband capabilities (e.g., support different block coding schemes). All such information may be conveyed via capabilities messages 205.

In some cases, many or all of the UEs 115 within the range of UE 115-a (e.g., within coverage area 110-a) may be configured to listen to only a single frequency band. In such cases, UE 115-a may distribute transmissions according to a bias or preference for the single frequency band. In other cases, UEs 115 within the range of UE 115-a may be configured to listen to various different frequency bands. In such cases, UE 115-a may identify a combined list of frequencies (e.g., based on individual lists of frequencies included in capabilities messages 205 associated with each of the advertising UEs 115). In some cases, the combined list of frequencies may include a limited number of frequency bands supported by some threshold percentage (e.g., a majority) of the advertising UEs 115, and UE 115-a may distribute transmissions based at least in part on a bias for the limited number of frequency bands. That is, UE 115-a may distribute transmissions (e.g., determine a transmission scheduling policy) based on a combined list of frequencies identified based on frequency information received via one or more capabilities messages 205 from advertising UEs 115 within range. The combined list of frequencies may include all frequencies indicated by the received capabilities messages 205, or may include a select or limited number of frequencies (e.g., including frequencies that some percentage, a majority, or all UEs 115 are capable of for reception). For example, the combined list of frequencies may include common frequency bands indicated by all or the majority of received capabilities messages 205. The combined list of frequencies may be used to uniformly distribute transmissions across (e.g., to reduce load on one or more particular frequency bands), or may be used to bias distribution of transmissions (e.g., the combined list of frequencies may be ordered according to some priority for distribution of transmissions). In some cases, the combined list of frequencies may further include information associated with which UEs 115 support which frequency bands on the list (e.g., which UEs 115 or how many UEs 115 support each frequency band on the combined list of frequencies).

Further, UE 115-*a* may identify a combined list of baseband capabilities. The combined list of baseband capabilities may include all block coding schemes indicated by the received capabilities messages, or may include a select or limited number of block coding schemes (e.g., including block coding schemes that some percentage, a majority, or all UEs 115 are capable of decoding). The combined list of baseband capabilities may be used to enable block coding schemes for transmissions on certain frequency bands. That is, UE 115-*a* may enable block coding schemes on frequency bands supported by UEs 115 that have indicated they support the block coding scheme. UE 115-*a* may therefore use baseband capability information and RF capability information received via capabilities messages 205 from advertising UEs 115 within range to determine a transmission scheduling policy, which may detail a distribution of transmissions across one or more frequency bands as well as block coding schemes enabled on the one or more frequency bands.

As a single example, UE 115-*b* and UE 115-*c* may be within range of UE 115-*a*. UE 115-*a* may receive capabilities message 205-*a* from UE 115-*b* and capabilities message 205-*b* from UE 115-*c*. Capabilities message 205-*a* may indicate UE 115-*b* supports listening capabilities on Frequency Band A and Frequency Band C, and may further indicate UE 115-*b* supports space frequency block code (SFBC). Capabilities message 205-*b* from UE 115-*c* may indicate UE 115-*c* supports listening capabilities on Frequency Band C and Frequency Band D, and may further indicate UE 115-*c* does not support SFBC. In such a scenario, UE 115-*a* may identify, based on capabilities message 205-*a* and capabilities message 205-*b*, a combined list of frequencies and a combined list of baseband capabilities. In some cases, the combined list of frequencies may include Frequency Band A, Frequency Band C, and Frequency Band D, and UE 115-*a* may determine a transmission scheduling policy that distributes transmissions over each of Frequency Band A, Frequency Band C, and Frequency Band D. In other cases, the combined list of frequencies may solely include Frequency Band C (e.g., as Frequency Band C is supported by both UE 115-*b* and UE 115-*c*), and UE 115-*a* may determine a transmission scheduling policy that biases transmissions on Frequency Band C. Additionally or alternatively, UE 115-*a* may determine a combined list of baseband capabilities, and may further enable SFBC on Frequency Band A (e.g., as Frequency Band C is also supported by UE 115-*c*, which does not support SFBC). The above example is provided for illustrative purposed only, various other UEs 115 with any number of different capabilities may employ techniques described herein by analogy, without departing from the scope of the present disclosure.

In some cases, capabilities messages 205 may be advertised by UEs 115 via sidelink control information (SCI) messages (e.g., SCI 1 over the air (OTA) or other control data for V2X sidelink). As the size of the SCI increases, a modulation and coding scheme (MCS) of the message may also be increased when advertising capabilities messages 205. In some cases, a bitmap of simultaneously supported frequencies in each band may be signaled for reception, and the list of frequencies (e.g., simultaneous or TDM) may be indicated for transmission. In some examples, the list of frequencies may indicate frequencies that the advertising UE 115 is currently listening on. In other cases, capabilities messages 205 may be advertised via a V2X message payload, as a part of a PDCP header extension, etc. In yet other cases, capabilities messages 205 may be conveyed via SCI with metadata advertised periodically (e.g., to allow UE 115 capability discovery). As such, capabilities messages 205 are explicitly signaled as a part of a communication protocol, and thus, are easily detectable by UEs 115 and allow for lower cost devices (e.g., devices that can process a limited number of messages). Further, capabilities messages 205 may include indications of whether or not capabilities advertised are static and/or dynamic.

As discussed, information conveyed via capabilities messages 205 may be used to determine or identify a scheduling policy for transmission of broadcast messages 210. If all, or a majority, of UEs 115 within range of UE 115-*a* are able to listen on a single frequency band (e.g., capable of listening to 1 evolved Universal Terrestrial Radio Access (E-UTRA) Absolute radio-frequency channel number (EARFCN)), the responding UE 115-*a* may bias transmissions on that EARFCN at a higher rate. Further, if all, or a majority, of UEs 115 within range of UE 115-*a* are capable of using a limited number of EARFCNs, then the responding UE 115-*a* may bias transmissions in descending order of most common EARFCN across the estimated set of recipients. Transmissions on alternate or other frequencies may thus be performed at a reduced rate. UE 115-*a* may perform carrier aggregation (e.g., for broadcast messages 210) on frequencies supported (e.g., actively being received by advertising UEs 115), as indicated by capabilities messages 205 received by UE 115-*a*. In some cases, UE 115-*a* may designate the most common EARFCN as the primary frequency for communication (e.g., of broadcast messages 210). In some cases, such carrier aggregation and primary frequency determinations may be referred to as determining the transmission scheduling policy. Capabilities messages 205 may also indicate baseband capabilities of advertising UEs 115 within range of UE 115-*a*. For example, UEs 115 may indicate whether they support STBC/SFBC decoding capabilities via capabilities messages 205. In some cases, such decoding capabilities may also be conveyed by UE 115-*a* (e.g., via broadcast messages 210). Using baseband capability information received via capabilities messages 205, UE 115-*a* may selectively (e.g., on a frequency basis) determine when to enable STBC/SFBC on a particular EARFCN based on a percentage of the UEs 115 within range having the STBC/SFBC decoding capabilities. Additionally, such determination of when to enable different block coding schemes may also, in some cases, be referred to as determining the transmission scheduling policy.

In some examples, distributed wireless network 200 may implement aspects of a V2X communications system. For example, some UEs 115 may be integrated with vehicles, integrated with buildings, integrated with other road side assistance applications. That is, in some cases distributed wireless network 200 may be configured to communicate information between vehicles to any entity that may interact the vehicle. Such distributed wireless networks 200 may be implemented along roads and other transportation through ways. For example, signs, infrastructure, power systems, and other entities may include UEs 115 that communicate using a V2X communication system (e.g., distributed wireless network 200). In some examples, road side repeaters may include a UE 115 to communicate using the distributed wireless network 200. The distributed wireless network 200 may also connect UEs 115 associated with individuals. For example, UEs 115 (e.g., smartphones) associated with of drivers, pedestrians, and/or other individuals may communicate using the distributed wireless network 200. V2X sidelink traffic may support a distributed mode of transmission scheduling (e.g., semi-persistent transmission-based mechanisms). In addition to V2X communications, distributed wireless network 200 may support D2D communications, P2P communications, etc.

In some cases, responding UEs 115 (e.g., UE 115-*a*) may identify advertising UEs 115 (e.g., UE 115-*b*, UE 115-*c*, UE 115-*d*, etc.) geo-locally as unique (e.g., via the advertising UE's source Layer 2 address). For example, responding UE 115-*a* may associate the MAC layer 24-bit source ID (SRC) Layer 2 address received in data (e.g., Physical Sidelink Shared Channel (PSSCH)) with the associated SCI 1 (e.g., SCI Format 1) message in case capabilities are included in the SCI 1 message and not in the payload. As another example, the advertising UEs 115 may include a 24-bit SRC Layer 2 address in the SCI 1 message (e.g., in case capabilities are transmitted without any associated PSSCH transmission).

The present disclosure may provide a framework for capabilities exchange within any wireless system that utilizes broadcast communications and stores such side information. As discussed herein, implementation of such techniques for UE capability discovery in distributed wireless networks may enable transmitting UEs 115 (e.g., responding UEs) to transmit on relevant frequencies based on the capabilities of UEs 115 within range. As the environment changes (e.g., as UEs 115 with different capabilities enter and exit the coverage area 110-*a*), UE 115-*a* may dynamically determine transmission scheduling policies such that resources are used in an effective manner. As such, system resource utilization may be improved. Further, baseband constrained scenarios may be optimized via efficient allocation of baseband resources for more critical communications.

Figure 3:
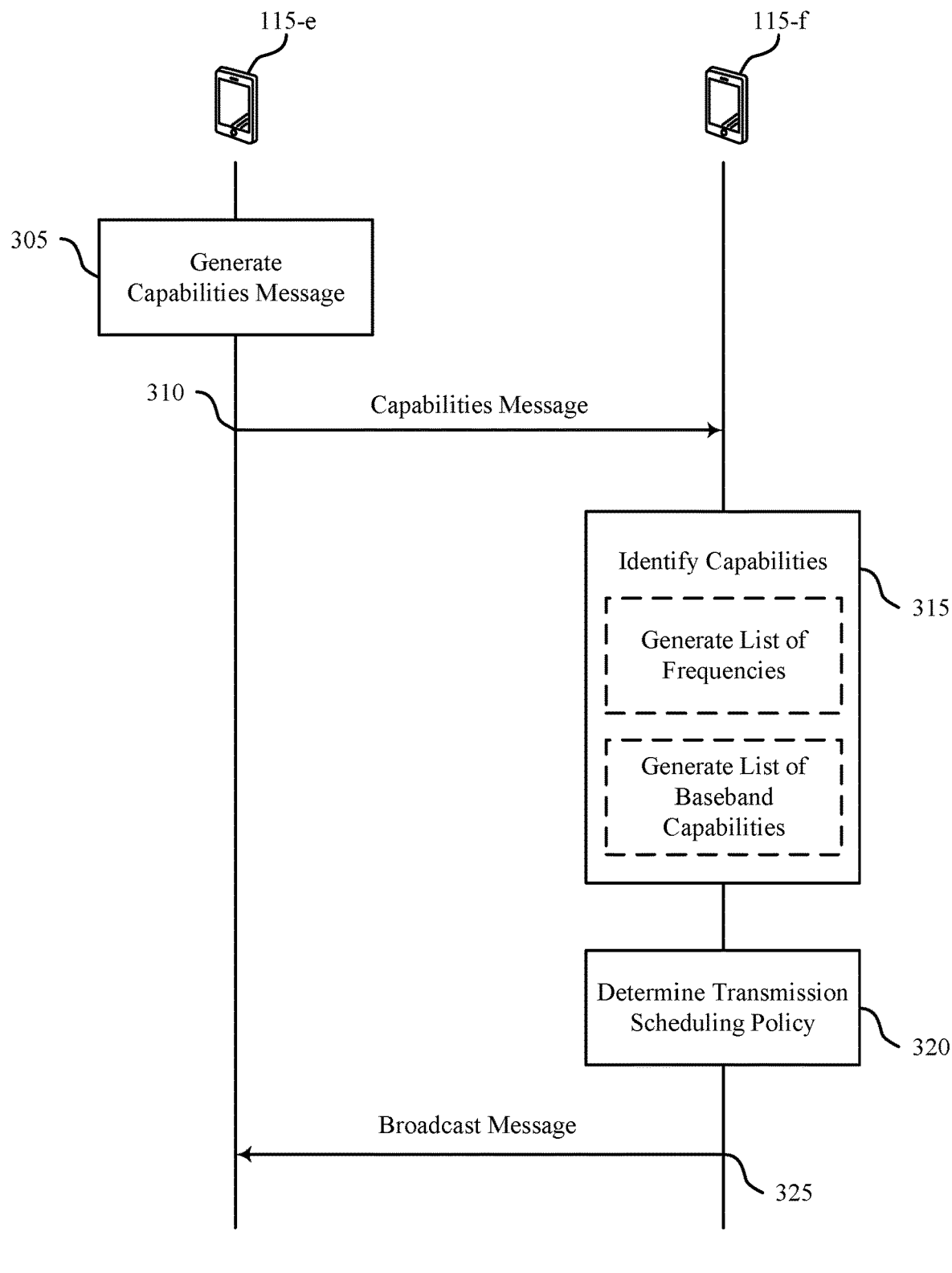
FIG. 3 illustrates an example of a process flow that supports techniques for UE capability discovery in distributed wireless networks in accordance with one or more aspects of the present disclosure.

FIG. 3 illustrates an example of a process flow 300 that supports techniques for UE capability discovery in distributed wireless networks in accordance with one or more aspects of the present disclosure. In some examples, process flow 300 may implement aspects of the distributed wireless network 200 and the wireless communications system 100. Process flow 300 may represent aspects of techniques performed by an advertising UE 115-*e* and a responding UE 115-*f*, which may represent the corresponding devices as described with reference to FIGS. 1-2. UE 115-*e* may signal capabilities to UE 115-*f*, and receive broadcast messages from UE 115-*f*, based on user equipment capability discovery techniques described herein.

At 305, UE 115-*e* may generate a capabilities message. The capabilities message may include a list of frequencies supported by UE 115-*e* (e.g., for transmission, reception, simultaneous demodulation, etc.) and/or baseband capabilities supported by UE 115-*e*. For example, the capabilities message may include a list of frequencies on which UE 115-*e* may be configured to support simultaneous reception, a list of frequencies on which UE 115-*e* may listen for communications, etc. In some cases, UE 115-*e* may generate a bitmap of the list of frequencies and generate the capabilities message based on the bitmap. Additionally or alternatively, generating the capabilities message may include encoding the capabilities message with baseband capabilities UE 115-*e* supports. Supported baseband capabilities may include, for example, STBC schemes, SFBC schemes, etc. Further, the capabilities message may include an indication of whether conveyed frequency capabilities information or baseband capabilities information is static or dynamic (e.g., changing over time).

At 310, UE 115-*e* may transmit the capabilities message to UE 115-*f*. In some cases, the capabilities message may be transmitted via an SCI message. In some examples, an MCS used in relation to the SCI message may vary based on the size of the SCI message. In other cases, the capabilities message may be transmitted via a V2X message payload, a PDCP header extension, a MAC payload, advertised by a metadata bit included in an SCI message, etc. Further, the capabilities message may, in some cases, be transmitted periodically.

At 315, responding UE 115-*f* may identify capabilities indicated by the received capability message (e.g., at 310). UE 115-*f* may identify radio frequency capabilities, baseband capabilities, or both, of advertising UE 115-*e*.

In some cases, UE 115-*f* may receive multiple capabilities messages from multiple UEs 115 within range of the UE 115-*f* (e.g., including capabilities message 310 from UE 115-*e*, in addition to capabilities messages from other UEs 115). In such cases, the UE 115-*f* may generate or identify a combined list of frequencies on which the multiple UEs 115 (e.g., associated with the multiple received capabilities messages) are configured to receive communications in the distributed network (e.g., based on individual lists of frequencies indicated by the individual capabilities message from each of the multiple UEs 115). Further, when identifying the combined list of frequencies, the UE 115-*f* may, in some examples, determine the multiple UEs 115 are configured to listen only to a single frequency band, determine a majority of the multiple UEs 115 are configured to listen to a limited number of frequency bands, etc. and distribute transmissions accordingly when determining the transmission scheduling policy at 320.

Additionally or alternatively, the capabilities message received at 310 may include baseband capabilities of UE 115-*e*. For example, baseband capabilities may indicate supported block coding schemes such as STBC schemes, SFBC schemes, etc. Further, in the scenarios where UE 115-*f* receives multiple capabilities messages from multiple UEs 115 within range of the UE 115-*f* (e.g., including capabilities message 310 from UE 115-*e*, in addition to capabilities messages from other UEs 115), UE 115-*f* may determine a percentage of the multiple UEs 115 that have block decoding baseband capabilities. Such information may be used when determining whether or not to enable block coding schemes on certain frequencies when determining a transmission scheduling policy at 320, as discussed in more detail below.

At 320, UE 115-*f* may determine a transmission scheduling policy based on the capabilities identified at 315. That is, UE 115-*f* may determine a transmission scheduling policy that distributes transmissions over frequency bands indicated by the generated list of frequencies and/or enables a block coding scheme for transmissions over frequency bands (e.g., depending on whether the one or more received capabilities messages include radio frequency capabilities, baseband capabilities, or both). In some cases, the UE 115-*f* may prioritize or bias transmissions on certain frequency bands based on the combined list of frequencies as discussed above at 315. Determining the transmission scheduling policy may include determining a primary frequency and/or a carrier aggregation scheme based on the combined list of frequencies. Additionally or alternatively, determining the transmission scheduling policy may include enabling a block coding scheme for transmissions on frequencies supported by UEs 115 that have indicated support for such block coding schemes.

At 325, UE 115-*f* may transmit a broadcast message to UE 115-*e*, based on the scheduling policy determined at 320. That is, the broadcast message, as well as additional broadcast messages, multicast messages, etc., may be transmitted according to the scheduling policy (e.g., via identified or determined frequency bands, block coding schemes, etc.) as detailed above.

Figure 4:
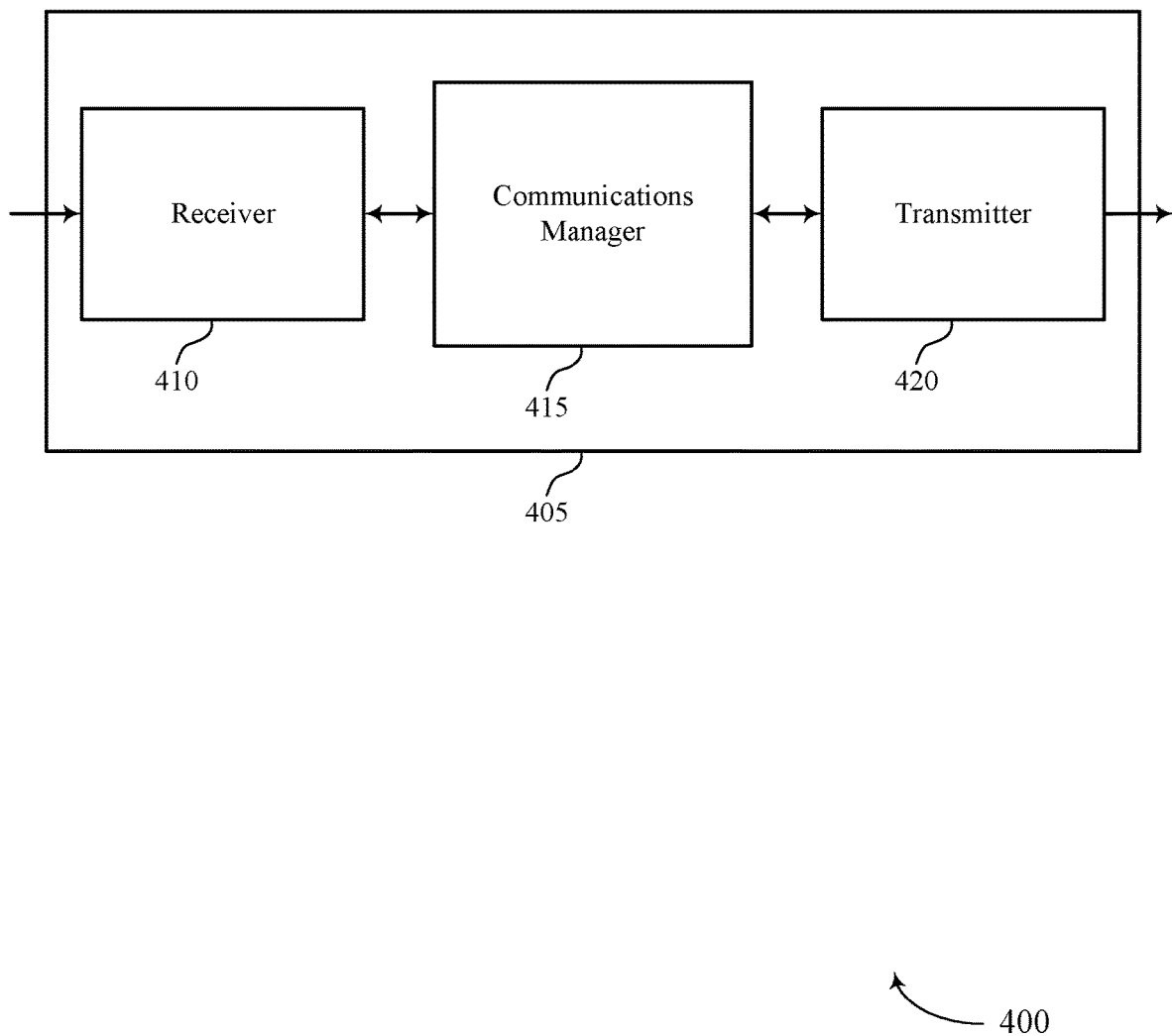
FIGS. 4 through 6 show block diagrams of a device that supports techniques for UE capability discovery in distributed wireless networks in accordance with one or more aspects of the present disclosure.

FIG. 4 shows a block diagram 400 of a wireless device 405 that supports techniques for UE capability discovery in distributed wireless networks in accordance with one or more aspects of the present disclosure. Wireless device 405 may be an example of aspects of a UE 115 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to techniques for UE capability discovery in distributed wireless networks, etc.). Information may be passed on to other components of the device 405. Receiver 410 may be an example of aspects of transceiver 735 described with reference to FIG. 7. Receiver 410 may utilize a single antenna or a set of antennas. For an advertising UE, receiver 410 may receive a broadcast message from at least one of the one or more second wireless devices based on a capabilities message transmitted by the advertising UE. An advertising UE may further receive a broadcast message (e.g., via receiver 410) from at least one of the one or more second wireless devices based on the baseband capabilities indicated by a capabilities message transmitted by the advertising UE. In some cases, the distributed wireless network supports V2X communications, public safety D2D communications, P2P communications, or combinations thereof.

Communications manager 415 may be an example of aspects of communications manager 102 and 715 described with reference to FIGS. 1 and 7.

Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Wireless device 405 (e.g., a UE 115) may include communications manager 415. When the wireless device 405 acts as an advertising UE, communications manager 415 may generate a capabilities message with a list of frequencies supported by the wireless device 405. When the wireless device 405 acts as a transmitting or responding UE, communications manager 415 may receive capabilities messages from advertising UEs in the distributed wireless network (e.g., where each of the capabilities messages include a list of frequencies supported by the respective advertising UEs) and identify, based on the capabilities messages, a combined list of frequencies on which the advertising UEs are collectively configured to receive communications in the distributed wireless network. For example, communications manager 415 may identify a combined list of frequencies on which a set of advertising UEs are configured to receive communications in the distributed wireless network and determine a transmission scheduling policy based on the combined list of frequencies. Further, communications manager 415 may identify a combined list of baseband capabilities of the set of advertising UEs in the distributed wireless network and determine a transmission scheduling policy based on the combined list of baseband capabilities.

Transmitter 420 may transmit signals generated by other components of the device 405. In some examples, transmitter 420 may be collocated with receiver 410 in a transceiver module. For example, transmitter 420 may be an example of aspects of transceiver 735 described with reference to FIG. 7. Transmitter 420 may utilize a single antenna or a set of antennas.

Wireless device 405 (e.g., a UE 115) may include transmitter 420. When the wireless device 405 acts as an advertising UE, transmitter 420 may transmit capabilities message to one or more second wireless devices of the distributed wireless network. When the wireless device 405 acts as a transmitting or responding UE, transmitter 420 may transmit a broadcast message in accordance with a transmission scheduling policy, transmit a broadcast message to advertising wireless devices in accordance with the transmission scheduling policy, transmit a broadcast message to advertising wireless devices using at least a subset of frequencies included in the combined list of frequencies, and transmit the broadcast message to the advertising wireless devices in accordance with the transmission scheduling policy. In some cases, the capabilities message is transmitted via a V2X message payload, via a PDCP header extension, via a media access control (MAC) payload, as advertised by a metadata bit included in an SCI message, or via combinations thereof. In some cases, the capabilities message is transmitted via an SCI message. In some cases, an MCS used in relation to the SCI message varies based on a size of the SCI message. In some cases, the capabilities message is transmitted periodically. In some cases, the distributed wireless network supports V2X communications, public safety D2D communications, P2P communications, or combinations thereof.

Figure 5:
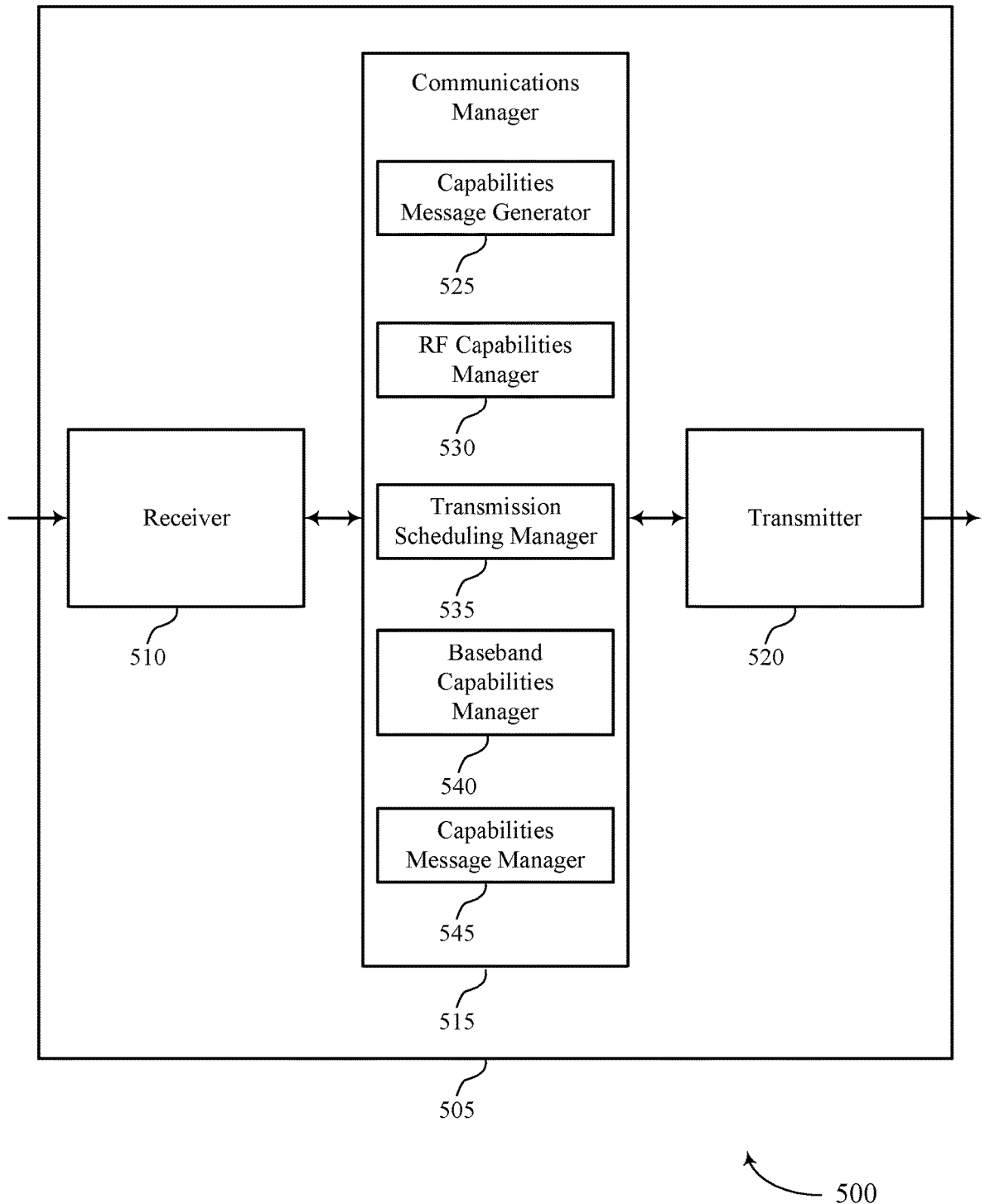

FIG. 5 shows a block diagram 500 of a wireless device 505 that supports techniques for UE capability discovery in distributed wireless networks in accordance with one or more aspects of the present disclosure. Wireless device 505 may be an example of aspects of a wireless device 405 or a UE 115 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for UE capability discovery in distributed wireless networks, etc.). Information may be passed on to other components of the device 505. Receiver 510 may be an example of aspects of transceiver 735 described with reference to FIG. 7. Receiver 510 may utilize a single antenna or a set of antennas.

Communications manager 515 may be an example of aspects of communications manager 715 described with reference to FIG. 7. Communications manager 515 may also include capabilities message generator 525, RF capabilities manager 530, transmission scheduling manager 535, baseband capabilities manager 540, and capabilities message manager 545.

When the wireless device 505 acts as an advertising UE, capabilities message generator 525 may generate a capabilities message with a list of frequencies supported by the wireless device and generate the capabilities message based on the bitmap. In some cases, the list of frequencies includes frequencies on which the wireless device 505 is configured to simultaneously support receipt of communications in the distributed wireless network. In some cases, the list of frequencies includes frequencies on which the wireless device 505 is listening for communications in the distributed wireless network. In some cases, generating the capabilities message further includes an indication of whether frequency capabilities information or baseband capabilities information of the wireless device 505, as included in the capabilities message, is static or dynamic.

When the wireless device 505 acts as an advertising UE, RF capabilities manager 530 may generate a bitmap of the list of frequencies based on the frequency capabilities of the wireless device 505. When the wireless device 505 acts as a responding UE, RF capabilities manager 530 may identify a combined list of frequencies on which a set of advertising wireless devices are configured to receive communications in the distributed wireless network and generate the combined list of frequencies based on individual lists of frequencies included in the one or more capabilities messages (e.g., where each individual list of frequencies identifies frequencies on which the respective advertising wireless devices are configured to receive communications in the distributed wireless network). RF capabilities manager 530 may distribute transmissions based on a bias for frequency bands of the limited number of frequency bands that are most commonly used by the advertising wireless devices within range and identify, based on the one or more capabilities messages, a list of frequencies on which the respective advertising wireless devices are configured to transmit communications in the distributed wireless network. RF capabilities manager 530 may identify, based on the one or more capabilities messages, a combined list of frequencies on which the advertising wireless devices are collectively configured to receive communications in the distributed wireless network. In some cases, identifying the combined list of frequencies on which the set of advertising wireless devices are configured to receive communications in the distributed wireless network includes receiving one or more capabilities messages from respective advertising wireless devices of the set of advertising wireless devices. In some cases, determining the transmission scheduling policy further includes determining that a majority of neighboring advertising wireless devices of the set of advertising wireless devices are configured to listen to a limited number of frequency bands. In some cases, the combined list of frequencies includes frequencies on which the respective advertising wireless devices are listening for communications in the distributed wireless network. In some cases, identifying the combined list of frequencies on which the respective advertising wireless devices are collectively configured to receive communications in the distributed wireless network includes identifying the combined list of frequencies via a bitmap included in each of the one or more received capabilities messages. In some cases, the combined list of frequencies includes frequencies on which the respective advertising wireless devices are configured to simultaneously support receipt of communications in the distributed wireless network. In some cases, determining the transmission scheduling policy further includes determining a primary frequency, a carrier aggregation scheme, or some combination thereof based on the combined list of frequencies.

When the wireless device 505 acts as a responding UE, transmission scheduling manager 535 may determine a transmission scheduling policy based on the combined list of frequencies. In some cases, determining the transmission scheduling policy further includes determining a primary frequency, a carrier aggregation scheme, or some combination thereof based on the one or more frequencies. In some cases, determining the transmission scheduling policy further includes determining that a majority of neighboring respective advertising wireless devices in the distributed wireless network are configured to listen to only a single frequency band. In such cases, (e.g., when advertising UEs support a single EARFCN), transmission scheduling manager 535 may distribute transmissions based on a bias for the single frequency band. In some cases, determining the transmission scheduling policy further includes: determining that a majority of neighboring respective advertising wireless devices in the distributed wireless network are configured to listen to a limited number of frequency bands. In such cases, transmission scheduling manager 535 may distribute transmissions based on a bias for frequency bands of the limited number of frequency bands that are most commonly used by the neighboring respective advertising wireless devices. Further, the transmission scheduling manager 535 may determine a transmission scheduling policy based on the baseband capabilities of the respective advertising wireless devices. In some cases, determining the transmission scheduling policy further includes determining that a threshold percentage of neighboring respective advertising wireless devices in the distributed wireless network have block decoding baseband capabilities.

Baseband capabilities manager 540 may (e.g., when the wireless device 505 acts as a responding UE) identify a combined list of baseband capabilities of a set of advertising wireless devices in the distributed wireless network or generate the combined list of baseband capabilities based on individual lists of baseband capabilities included in one or more received capabilities messages. Baseband capabilities manager 540 may identify, based on capabilities messages received by the wireless device 505, baseband capabilities of the respective advertising wireless devices within the distributed wireless network. In some cases, identifying the combined list of baseband capabilities of a set of advertising wireless devices in the distributed wireless network includes receiving one or more capabilities messages from respective advertising wireless devices. In some cases, determining the transmission scheduling policy further includes determining that a threshold percentage of neighboring advertising wireless devices have block decoding baseband capabilities. In some cases, when the wireless device 505 acts as an advertising UE, the baseband capabilities manager 540 may encode the capabilities message with baseband capabilities supported by the wireless device 505. In some cases, the baseband capabilities include a STBC scheme or a SFBC scheme.

Capabilities message manager 545 may (e.g., when the wireless device 505 acts as a responding UE) receive one or more capabilities messages from advertising wireless devices in the distributed wireless network. Each of the one or more capabilities messages includes a list of frequencies supported by the advertising wireless devices. In some cases, receiving the one or more capabilities messages from the advertising wireless devices includes receiving the one or more capabilities messages via an SCI message.

Transmitter 520 may transmit signals generated by other components of the device. In some examples, transmitter 520 may be collocated with receiver 510 in a transceiver module. For example, transmitter 520 may be an example of aspects of transceiver 735 described with reference to FIG. 7. Transmitter 520 may utilize a single antenna or a set of antennas.

Figure 6:
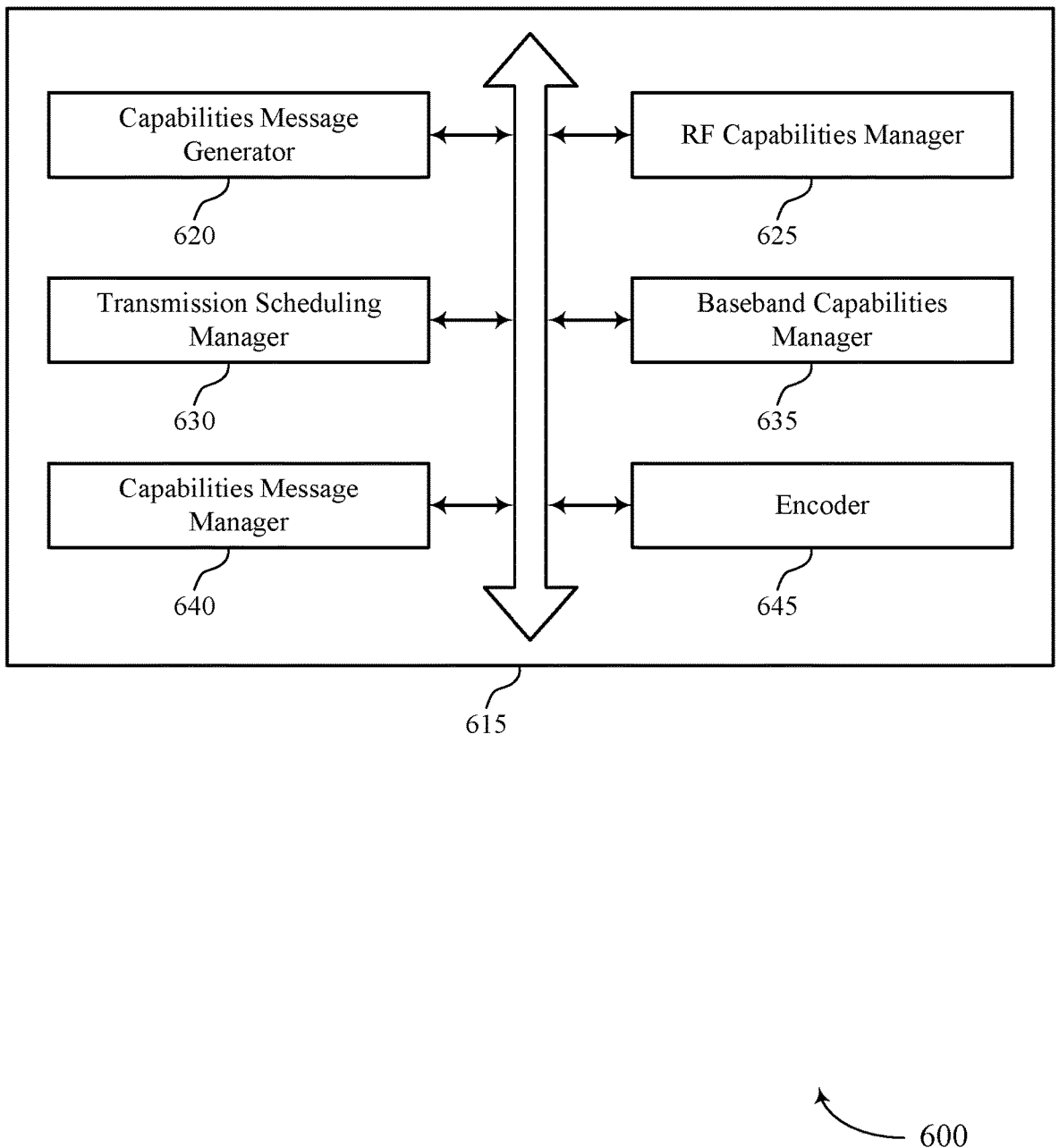

FIG. 6 shows a block diagram 600 of a communications manager 615 that supports techniques for UE capability discovery in distributed wireless networks in accordance with one or more aspects of the present disclosure. Communications manager 615 may be an example of aspects of communications manager 415, 515, or 715 described with reference to FIGS. 4, 5, and 7. Communications manager 615 may include capabilities message generator 620, RF capabilities manager 625, transmission scheduling manager 630, baseband capabilities manager 635, capabilities message manager 640, and encoder 645. Each of these modules may communicate, directly or indirectly, with one another (e.g., via one or more buses).

When the wireless device 605 acts as an advertising UE, capabilities message generator 620 may generate a capabilities message with a list of frequencies supported by the wireless device 605 (e.g., by generating the capabilities message based on a bitmap of frequencies generated by RF capabilities manager 625). In some cases, the list of frequencies includes frequencies on which the wireless device 605 is configured to simultaneously support receipt of communications in the distributed wireless network. In some cases, the list of frequencies includes frequencies on which the wireless device 605 is listening for communications in the distributed wireless network. In some cases, generating the capabilities message further includes an indication of whether frequency capabilities information or baseband capabilities information of the wireless device 605, as included in the capabilities message, is static or dynamic.

When the wireless device 605 acts as an advertising UE, RF capabilities manager 625 may generate a bitmap of the list of frequencies based on the frequency capabilities of the wireless device. When the wireless device 605 acts as a responding UE, RF capabilities manager 625 may identify a combined list of frequencies on which a set of advertising wireless devices are configured to receive communications in the distributed wireless network and generate a combined list of frequencies based on individual lists of frequencies included in the one or more capabilities messages (e.g., where each individual list of frequencies identifies frequencies on which the respective advertising wireless devices are configured to receive communications in the distributed wireless network). RF capabilities manager 625 may identify, based on the one or more capabilities messages, a list of frequencies on which the respective advertising wireless devices are configured to transmit communications in the distributed wireless network and identify, based on the one or more capabilities messages, a combined list of frequencies on which the respective advertising wireless devices are collectively configured to receive communications in the distributed wireless network. In some cases, the combined list of frequencies includes frequencies on which the respective second wireless devices are listening for communications in the distributed wireless network. In some cases, identifying the combined list of frequencies on which the respective advertising wireless devices are collectively configured to receive communications in the distributed wireless network includes identifying the combined list of frequencies via a bitmap included in each of the one or more capabilities messages. In some cases, the combined list of frequencies includes frequencies on which the respective advertising wireless devices are configured to simultaneously support receipt of communications in the distributed wireless network.

When the wireless device 605 acts as a responding UE, transmission scheduling manager 630 may determine a transmission scheduling policy based on the combined list of frequencies. In some cases, determining the transmission scheduling policy further includes determining a primary frequency, a carrier aggregation scheme, or some combination thereof based on the one or more frequencies. In some cases, determining the transmission scheduling policy further includes determining that a majority of neighboring respective advertising wireless devices in the distributed wireless network are configured to listen to only a single frequency band. In such cases, (e.g., when advertising UEs support a single EARFCN), transmission scheduling manager 630 may distribute transmissions based on a bias for the single frequency band. In some cases, determining the transmission scheduling policy further includes: determining that a majority of neighboring respective advertising wireless devices in the distributed wireless network are configured to listen to a limited number of frequency bands. In such cases, transmission scheduling manager 630 may distribute transmissions based on a bias for frequency bands of the limited number of frequency bands that are most commonly used by the neighboring respective advertising wireless devices. Further, transmission scheduling manager 630 may determine a transmission scheduling policy based on the baseband capabilities of the respective advertising wireless devices. In some cases, determining the transmission scheduling policy further includes determining that a threshold percentage of neighboring respective advertising wireless devices in the distributed wireless network have block decoding baseband capabilities.

Baseband capabilities manager 635 may (e.g., when the wireless device acts as a responding UE) identify a combined list of baseband capabilities of a set of advertising wireless devices in the distributed wireless network or generate the combined list of baseband capabilities based on individual lists of baseband capabilities included in one or more received capabilities messages. Baseband capabilities manager 635 may identify, based on capabilities messages received by the wireless device 605, baseband capabilities of the respective advertising wireless devices within the distributed wireless network. In some cases, identifying the combined list of baseband capabilities of a set of advertising wireless devices in the distributed wireless network includes receiving one or more capabilities messages from respective advertising wireless devices. In some cases, determining the transmission scheduling policy further includes determining that a threshold percentage of neighboring advertising wireless devices have block decoding baseband capabilities. In some cases, when the wireless device acts as an advertising UE, the baseband capabilities manager 635 may encode the capabilities message with baseband capabilities supported by the wireless device 605. In some cases, the baseband capabilities include a STBC scheme or a SFBC scheme.

Capabilities message manager 640 may (e.g., when the wireless device 605 acts as responding UE) receive one or more capabilities messages from advertising wireless devices in the distributed wireless network. Each of the one or more capabilities messages includes a list of frequencies supported by the advertising wireless devices. In some cases, receiving the one or more capabilities messages from the advertising wireless devices includes receiving the one or more capabilities messages via an SCI message. In some cases, an MCS used in relation to the SCI message varies based on a size of the SCI message. In some cases, receiving the one or more capabilities messages from the respective second wireless devices includes: receiving the one or more capabilities messages via a V2X message payload, via a PDCP header extension, via a MAC payload, as advertised by a metadata bit included in an SCI message, or via combinations thereof. In some cases, the one or more capabilities messages include an indication of whether frequency capabilities information or baseband capabilities information of the respective second wireless devices, as included in the one or more capabilities message, is static or dynamic.

Encoder 645 may enable a block coding scheme for transmissions on frequencies that are supported by the threshold percentage of neighboring respective second wireless devices. In some cases, the block coding scheme includes an STBC scheme or an SFBC scheme.

Figure 7:
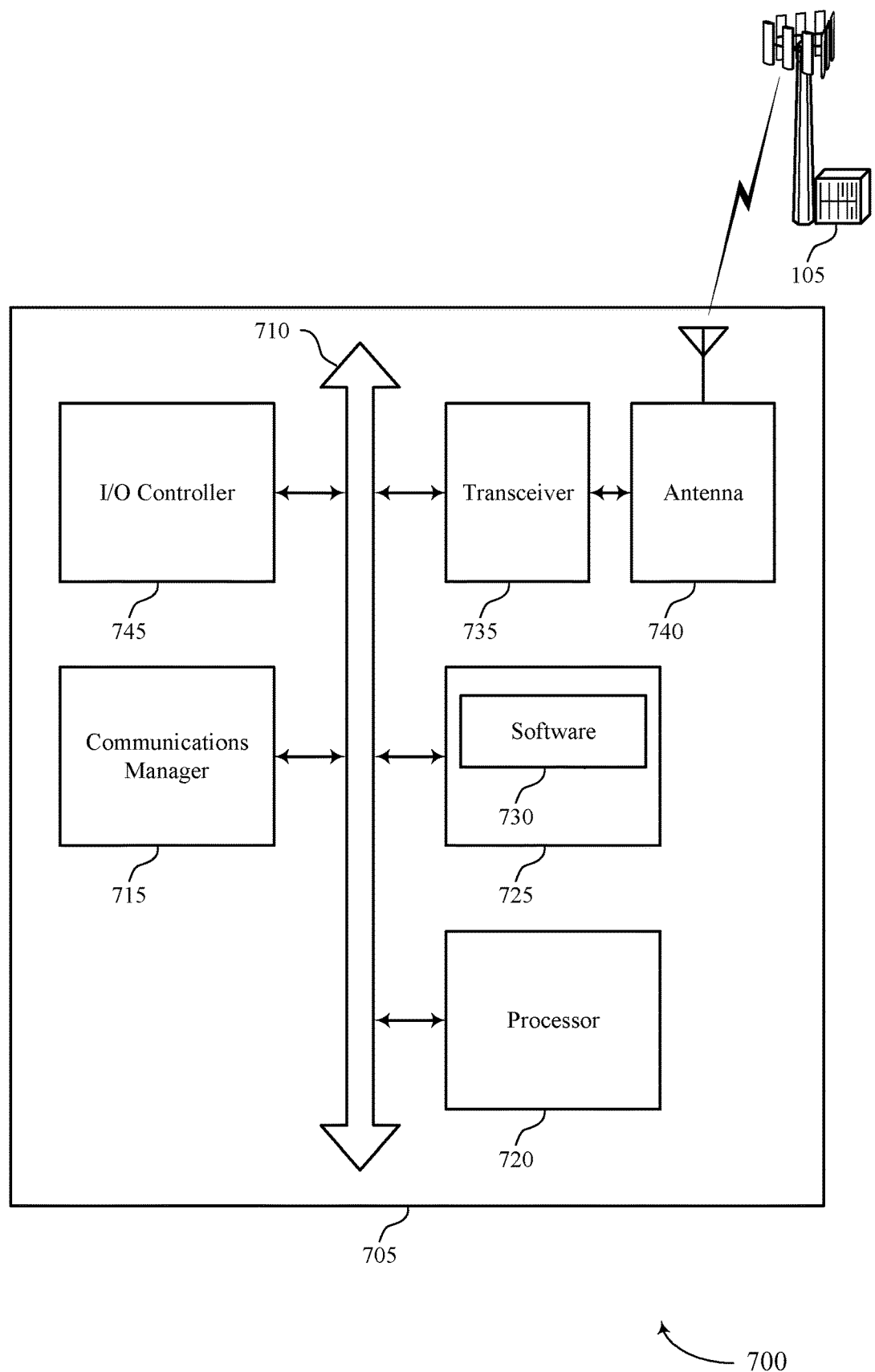
FIG. 7 illustrates a block diagram of a system including a UE that supports techniques for UE capability discovery in distributed wireless networks in accordance with one or more aspects of the present disclosure.

FIG. 7 shows a diagram of a system 700 including a device 705 that supports techniques for UE capability discovery in distributed wireless networks in accordance with one or more aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting techniques for UE capability discovery in distributed wireless networks).

Memory 725 may include random access memory (RAM) and read only memory (ROM). Memory 725 may store computer-readable, computer-executable software 730 including instructions that, when executed, cause the processor to perform various functions described herein. In some cases, memory 725 may contain, among other things, a basic input/output system (BIOS) which may control basic hardware or software operation such as the interaction with peripheral components or devices.

Software 730 may include code to implement aspects of the present disclosure, including code to support techniques for UE capability discovery in distributed wireless networks. Software 730 may be stored in a non-transitory computer-readable medium such as system memory or other memory. In some cases, software 730 may not be directly executable by processor 720 but may cause a computer (e.g., when compiled and executed) to perform functions described herein.

Transceiver 735 may communicate bi-directionally, via one or more antennas, wired, or wireless links as described above. For example, transceiver 735 may represent a wireless transceiver and may communicate bi-directionally with another wireless transceiver. Transceiver 735 may also include a modem to modulate the packets and provide the modulated packets to the antennas for transmission, and to demodulate packets received from the antennas.

In some cases, the wireless device 705 may include a single antenna 740. However, in some cases the device 705 may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
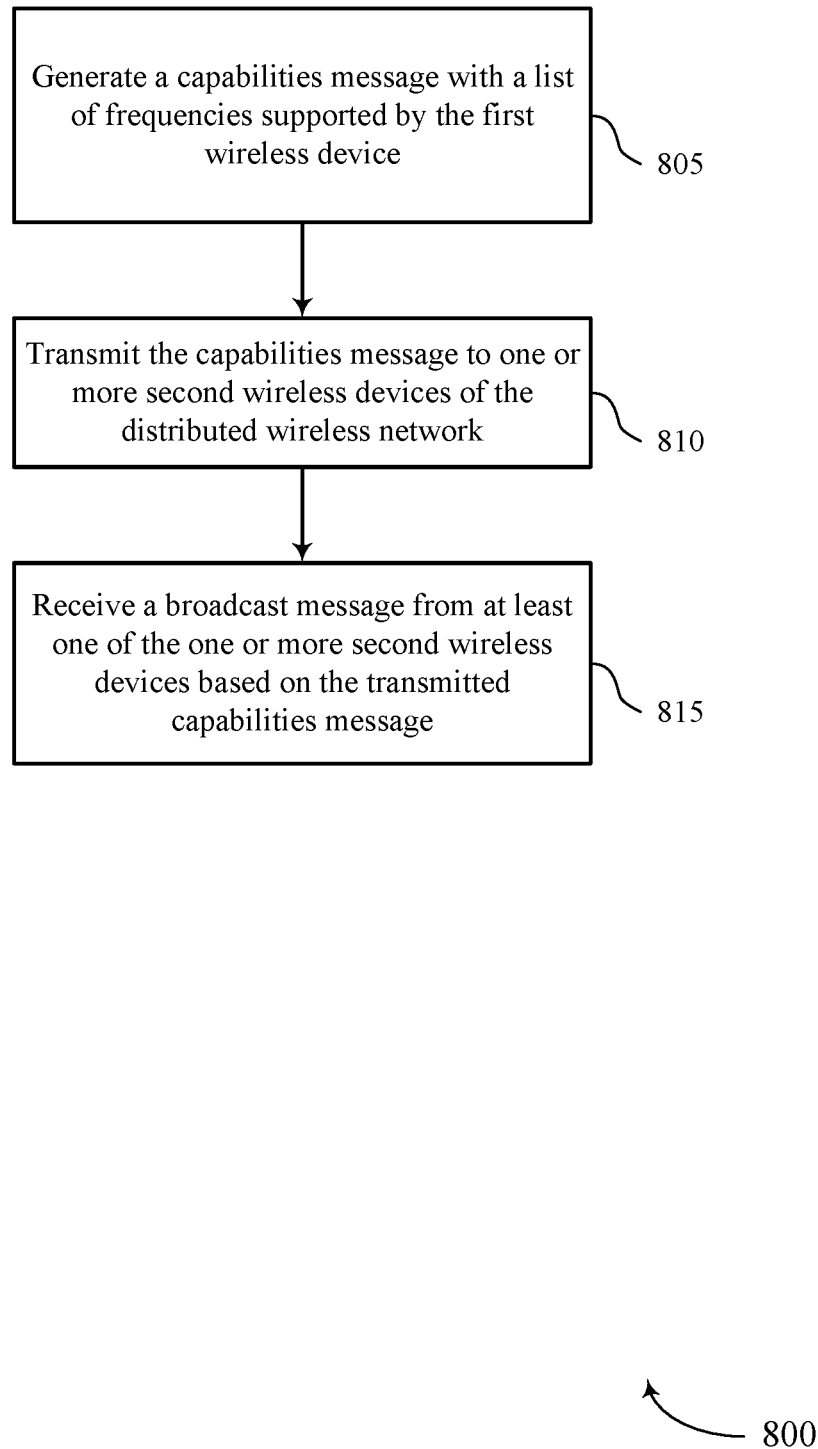
FIGS. 8 through 16 illustrate methods for techniques for UE capability discovery in distributed wireless networks in accordance with one or more aspects of the present disclosure.

FIG. 8 shows a flowchart illustrating a method 800 for advertising UE techniques for capability discovery in distributed wireless networks in accordance with one or more aspects of the present disclosure. The operations of method 800 may be implemented by a UE 115 or its components as described herein. For example, the operations of method 800 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 805, the UE 115 may generate a capabilities message with a list of frequencies supported by the UE 115. The operations of block 805 may be performed according to the methods described herein. In certain examples, aspects of the operations of block 805 may be performed by capabilities message generator 415, 525, 620, or 715 as described with reference to FIGS. 4 through 7.

At block 810, the UE 115 may transmit the capabilities message to one or more wireless devices (e.g., transmitting or responding UEs) of the distributed wireless network. The operations of block 810 may be performed according to the methods described herein. In certain examples, aspects of the operations of block 810 may be performed by transmitter 420, 520, or 735 as described with reference to FIGS. 4, 5, and 7.

At block 815, the UE 115 may receive a broadcast message from at least one of the one or more wireless devices based at least in part on the transmitted capabilities message. The operations of block 815 may be performed according to the methods described herein. In certain examples, aspects of the operations of block 815 may be performed by receiver 410, 510, or 735 as described with reference to FIGS. 4, 5, and 7.

Figure 9:
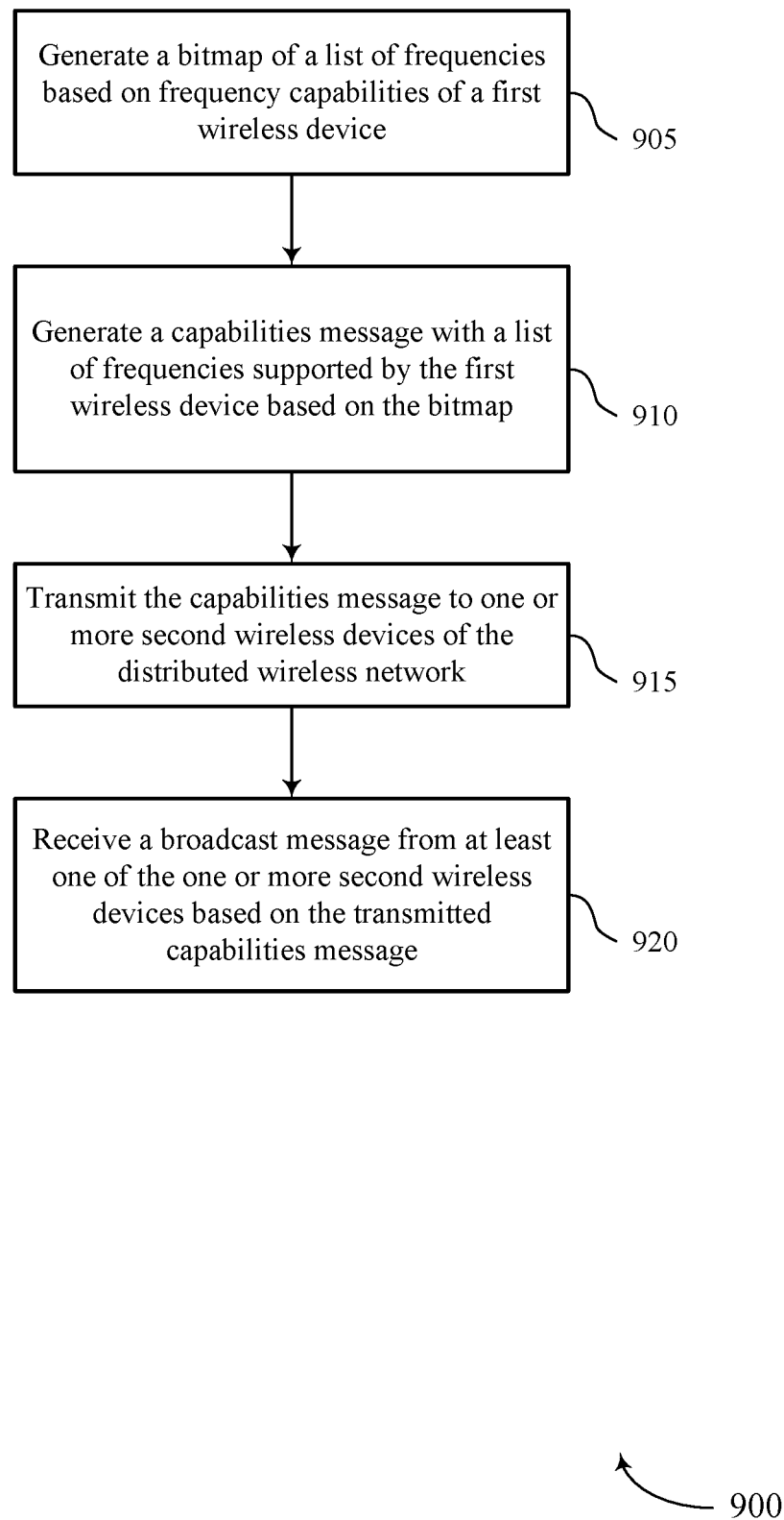

FIG. 9 shows a flowchart illustrating a method 900 for advertising UE techniques for capability discovery in distributed wireless networks in accordance with one or more aspects of the present disclosure. The operations of method 900 may be implemented by a UE 115 or its components as described herein. For example, the operations of method 900 may be performed by a communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 905, the UE 115 may generate a bitmap of the list of frequencies based at least in part on the frequency capabilities of the UE 115. The operations of block 905 may be performed according to the methods described herein. In certain examples, aspects of the operations of block 905 may be performed by RF capabilities manager 415, 530, 625, or 715 as described with reference to FIGS. 4 through 7.

At block 910, the UE 115 may generate a capabilities message with a list of frequencies supported by the UE 115, based at least in part on the bitmap. The operations of block 910 may be performed according to the methods described herein. In certain examples, aspects of the operations of block 910 may be performed by capabilities message generator 415, 525, 620, or 715 as described with reference to FIGS. 4 through 7.

At block 915, the UE 115 may transmit the capabilities message to one or more second wireless devices of the distributed wireless network. The operations of block 915 may be performed according to the methods described herein. In certain examples, aspects of the operations of block 915 may be performed by transmitter 420, 520, or 735 as described with reference to FIGS. 4, 5, and 7.

At block 920, the UE 115 may receive a broadcast message from at least one of the one or more second wireless devices based at least in part on the transmitted capabilities message. The operations of block 920 may be performed according to the methods described herein. In certain examples, aspects of the operations of block 920 may be performed by receiver 410, 510, or 735 as described with reference to FIGS. 4, 5, and 7.

Figure 10:
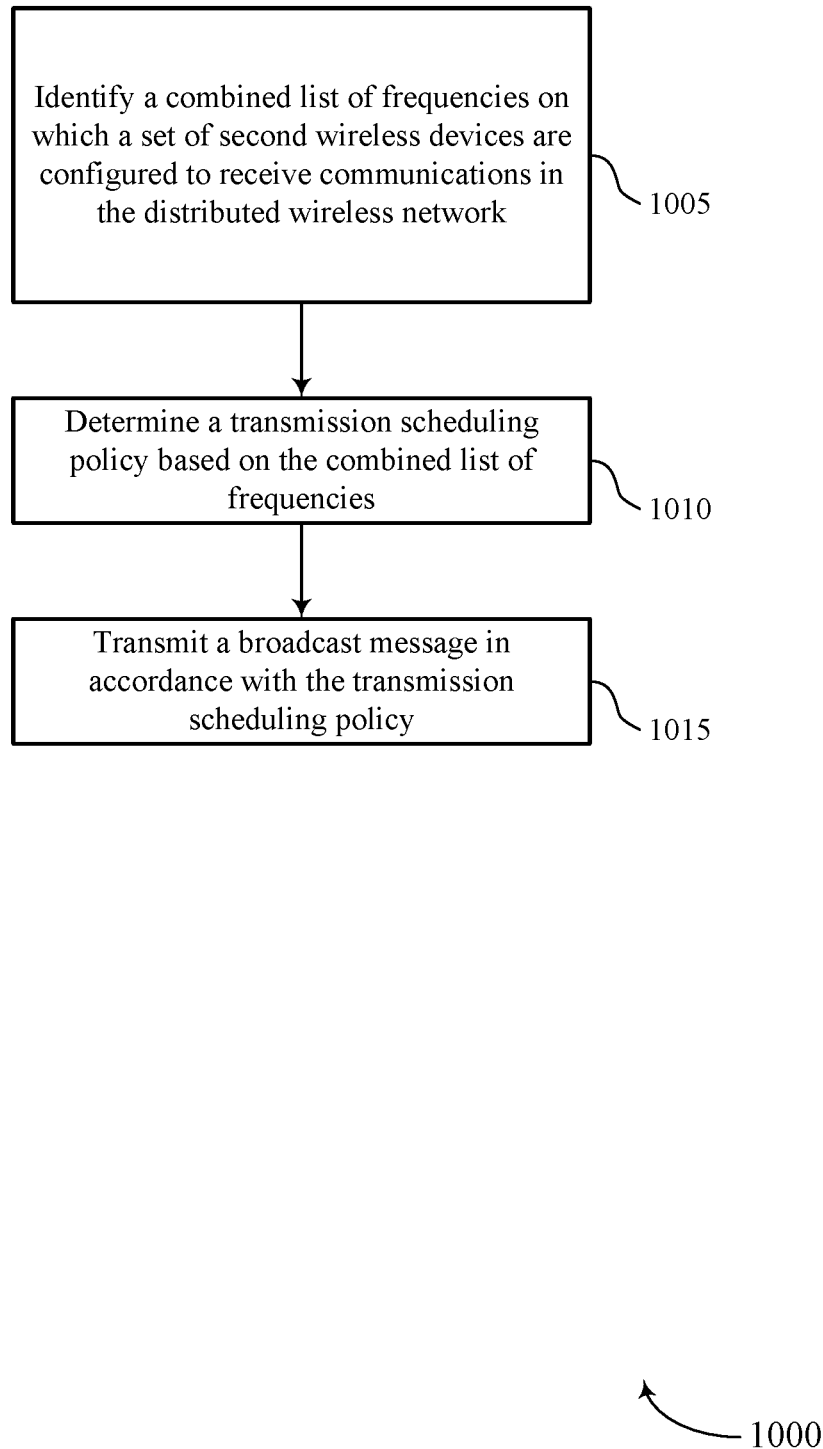

FIG. 10 shows a flowchart illustrating a method 1000 for responding UE techniques for capability discovery in distributed wireless networks in accordance with one or more aspects of the present disclosure. The operations of method 1000 may be implemented by a UE 115 or its components as described herein. For example, the operations of method 1000 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1005, the UE 115 may identify a combined list of frequencies on which a plurality of advertising wireless devices are configured to receive communications in the distributed wireless network. The operations of block 1005 may be performed according to the methods described herein. In certain examples, aspects of the operations of block 1005 may be performed by RF capabilities manager 415, 530, 625, or 715 as described with reference to FIGS. 4 through 7.

At block 1010, the UE 115 may determine a transmission scheduling policy based at least in part on the combined list of frequencies. The operations of block 1010 may be performed according to the methods described herein. In certain examples, aspects of the operations of block 1010 may be performed by transmission scheduling manager 415, 535, 630, or 715 as described with reference to FIGS. 4 through 7.

At block 1015, the UE 115 may transmit a broadcast message in accordance with the transmission scheduling policy. The operations of block 1015 may be performed according to the methods described herein. In certain examples, aspects of the operations of block 1015 may be performed by transmitter 420, 520, or 735 as described with reference to FIGS. 4, 5 and 7.

Figure 11:
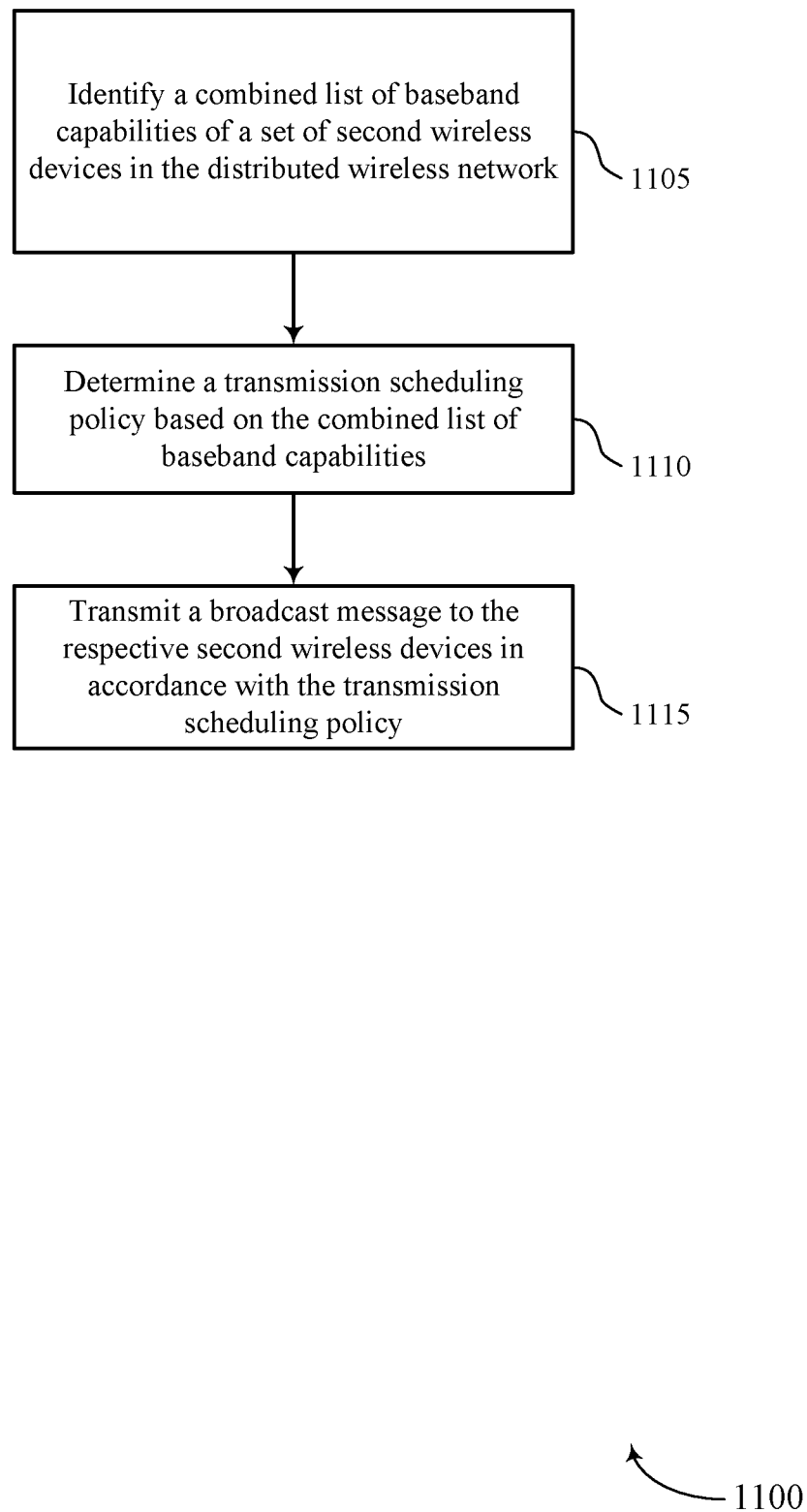

FIG. 11 shows a flowchart illustrating a method 1100 for responding UE techniques for capability discovery in distributed wireless networks in accordance with one or more aspects of the present disclosure. The operations of method 1100 may be implemented by a UE 115 or its components as described herein. For example, the operations of method 1100 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1105, the UE 115 may identify a combined list of baseband capabilities of a plurality of advertising wireless devices in the distributed wireless network. The operations of block 1105 may be performed according to the methods described herein. In certain examples, aspects of the operations of block 1105 may be performed by baseband capabilities manager 415, 540, 635, or 715 as described with reference to FIGS. 4 through 7.

At block 1110, the UE 115 may determine a transmission scheduling policy based at least in part on the combined list of baseband capabilities. The operations of block 1110 may be performed according to the methods described herein. In certain examples, aspects of the operations of block 1110 may be performed by transmission scheduling manager 415, 535, 630 or 715 as described with reference to FIGS. 4 through 7.

At block 1115, the UE 115 may transmit a broadcast message to the respective advertising wireless devices in accordance with the transmission scheduling policy. The operations of block 1115 may be performed according to the methods described herein. In certain examples, aspects of the operations of block 1115 may be performed by transmitter 420, 520, or 735 as described with reference to FIGS. 4, 5 and 7.

Figure 12:
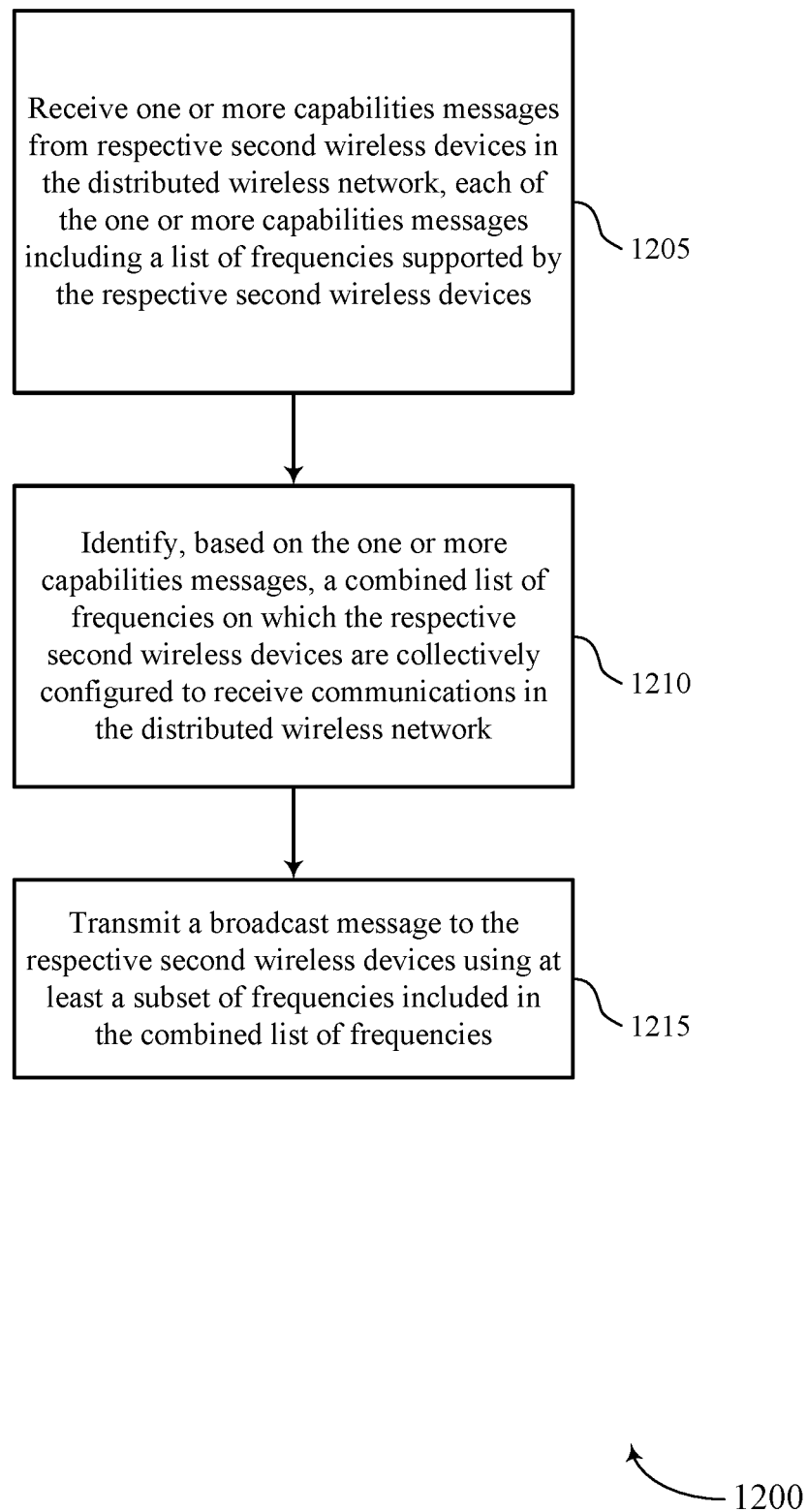

FIG. 12 shows a flowchart illustrating a method 1200 for responding UE techniques for capability discovery in distributed wireless networks in accordance with one or more aspects of the present disclosure. The operations of method 1200 may be implemented by a UE 115 or its components as described herein. For example, the operations of method 1200 may be performed by communications manager 415, 515, 616, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205, the UE 115 may receive one or more capabilities messages from advertising wireless devices in the distributed wireless network, each of the one or more capabilities messages may include a list of frequencies supported by the advertising wireless devices. The operations of block 1205 may be performed according to the methods described herein. In certain examples, aspects of the operations of block 1205 may be performed by capabilities message manager 415, 545, 640, or 715 as described with reference to FIGS. 4 through 7.

At block 1210, the UE 115 may identify, based at least in part on the one or more capabilities messages, a combined list of frequencies on which the advertising wireless devices are collectively configured to receive communications in the distributed wireless network. The operations of block 1210 may be performed according to the methods described herein. In certain examples, aspects of the operations of block 1210 may be performed by RF capabilities manager 415, 530, 625, or 715 as described with reference to FIGS. 4 through 7.

At block 1215, the UE 115 may transmit a broadcast message to the advertising wireless devices using at least a subset of frequencies included in the combined list of frequencies. The operations of block 1215 may be performed according to the methods described herein. In certain examples, aspects of the operations of block 1215 may be performed by transmitter 420, 520, or 735 as described with reference to FIGS. 4, 5, and 7.

Figure 13:
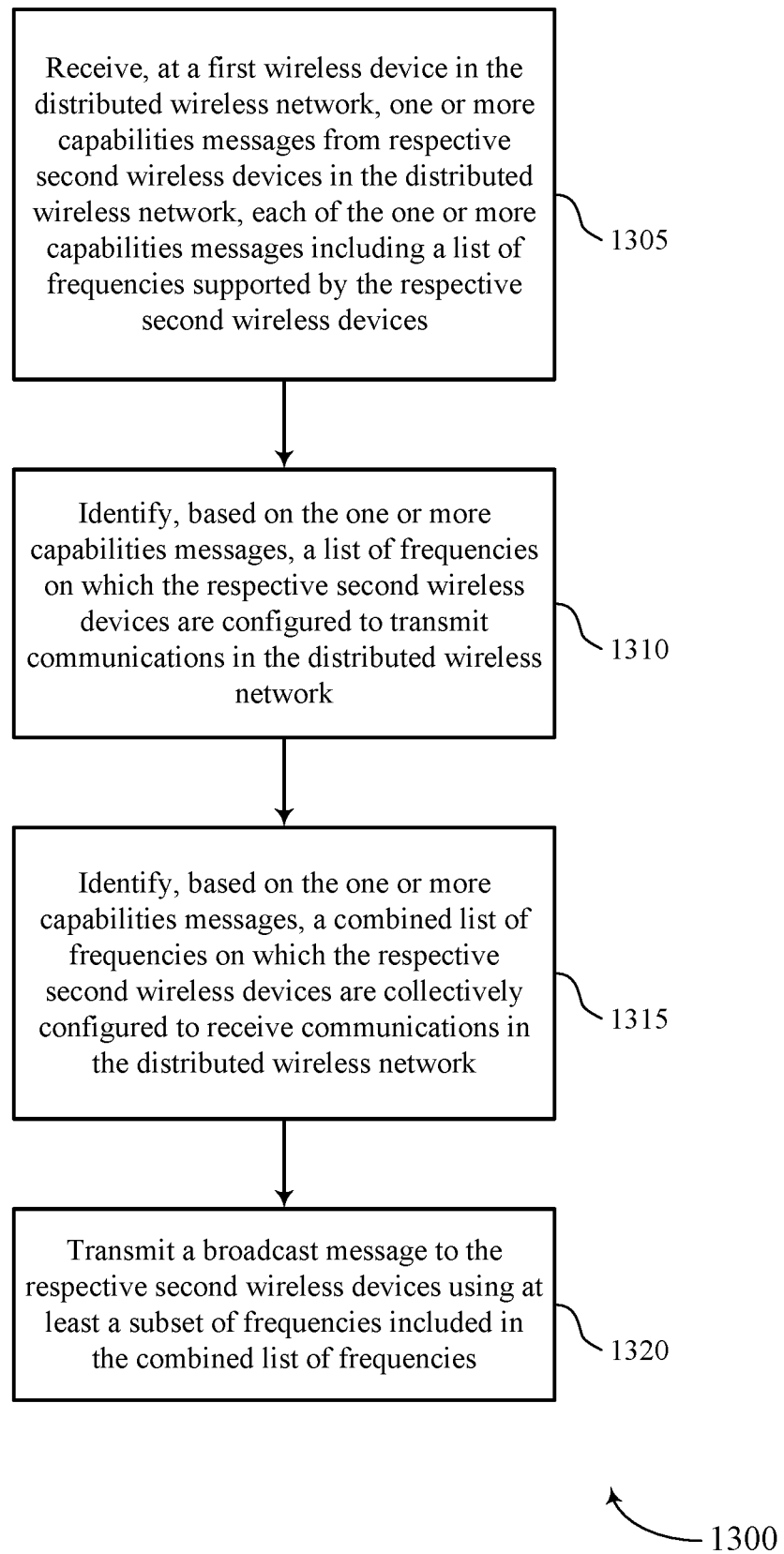

FIG. 13 shows a flowchart illustrating a method 1300 for responding UE techniques for capability discovery in distributed wireless networks in accordance with one or more aspects of the present disclosure. The operations of method 1300 may be implemented by a UE 115 or its components as described herein. For example, the operations of method 1300 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305, the UE 115 may receive one or more capabilities messages from advertising wireless devices in the distributed wireless network, each of the one or more capabilities messages may include a list of frequencies supported by the advertising wireless devices. The operations of block 1305 may be performed according to the methods described herein. In certain examples, aspects of the operations of block 1305 may be performed by capabilities message manager 415, 545, 640, or 715 as described with reference to FIGS. 4 through 7.

At block 1310, the UE 115 may identify, based at least in part on the one or more capabilities messages, a list of frequencies on which the respective second wireless devices are configured to transmit communications in the distributed wireless network. The operations of block 1310 may be performed according to the methods described herein. In certain examples, aspects of the operations of block 1310 may be performed by RF capabilities manager 415, 530, 625, or 715 as described with reference to FIGS. 4 through 7.

At block 1315, the UE 115 may identify, based at least in part on the one or more capabilities messages, a combined list of frequencies on which the advertising wireless devices are collectively configured to receive communications in the distributed wireless network. The operations of block 1315 may be performed according to the methods described herein. In certain examples, aspects of the operations of block 1315 may be performed by RF capabilities manager 415, 530, 625, or 715 as described with reference to FIGS. 4 through 7.

At block 1320, the UE 115 may transmit a broadcast message to the respective advertising wireless devices using at least a subset of frequencies included in the combined list of frequencies. The operations of block 1320 may be performed according to the methods described herein. In certain examples, aspects of the operations of block 1320 may be performed by transmitter 420, 520, or 735 as described with reference to FIGS. 4, 5, and 7.

Figure 14:
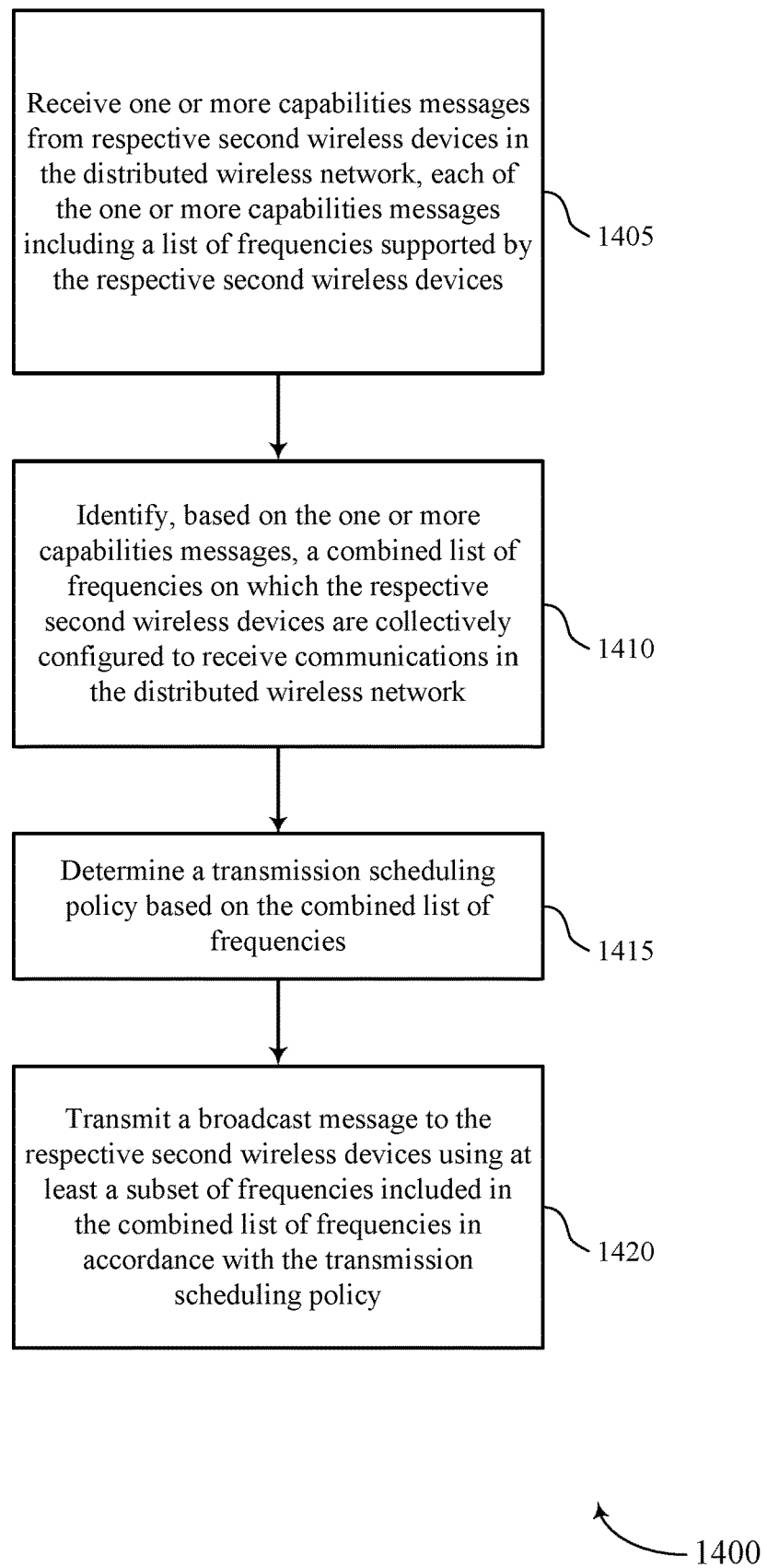

FIG. 14 shows a flowchart illustrating a method 1400 for responding UE techniques for capability discovery in distributed wireless networks in accordance with one or more aspects of the present disclosure. The operations of method 1400 may be implemented by a UE 115 or its components as described herein. For example, the operations of method 1400 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may receive one or more capabilities messages from respective second wireless devices in the distributed wireless network, each of the one or more capabilities messages including a list of frequencies supported by the respective second wireless devices. The operations of block 1405 may be performed according to the methods described herein. In certain examples, aspects of the operations of block 1405 may be performed by capabilities message manager 415, 545, 640, or 715 as described with reference to FIGS. 4 through 7.

At block 1410, the UE 115 may identify, based at least in part on the one or more capabilities messages, a combined list of frequencies on which the respective second wireless devices are collectively configured to receive communications in the distributed wireless network. The operations of block 1410 may be performed according to the methods described herein. In certain examples, aspects of the operations of block 1410 may be performed by RF capabilities manager 415, 530, 625, or 715 as described with reference to FIGS. 4 through 7.

At block 1415, the UE 115 may determine a transmission scheduling policy based at least in part on the combined list of frequencies. The operations of block 1415 may be performed according to the methods described herein. In certain examples, aspects of the operations of block 1415 may be performed by transmission scheduling manager 415, 535, 630, or 715 as described with reference to FIGS. 4 through 7.

At block 1420, the UE 115 may transmit a broadcast message to the respective second wireless devices using at least a subset of frequencies included in the combined list of frequencies. The operations of block 1420 may be performed according to the methods described herein. In certain examples, aspects of the operations of block 1420 may be performed by transmitter 420, 520, or 735 as described with reference to FIGS. 4, 5, and 7.

Figure 15:
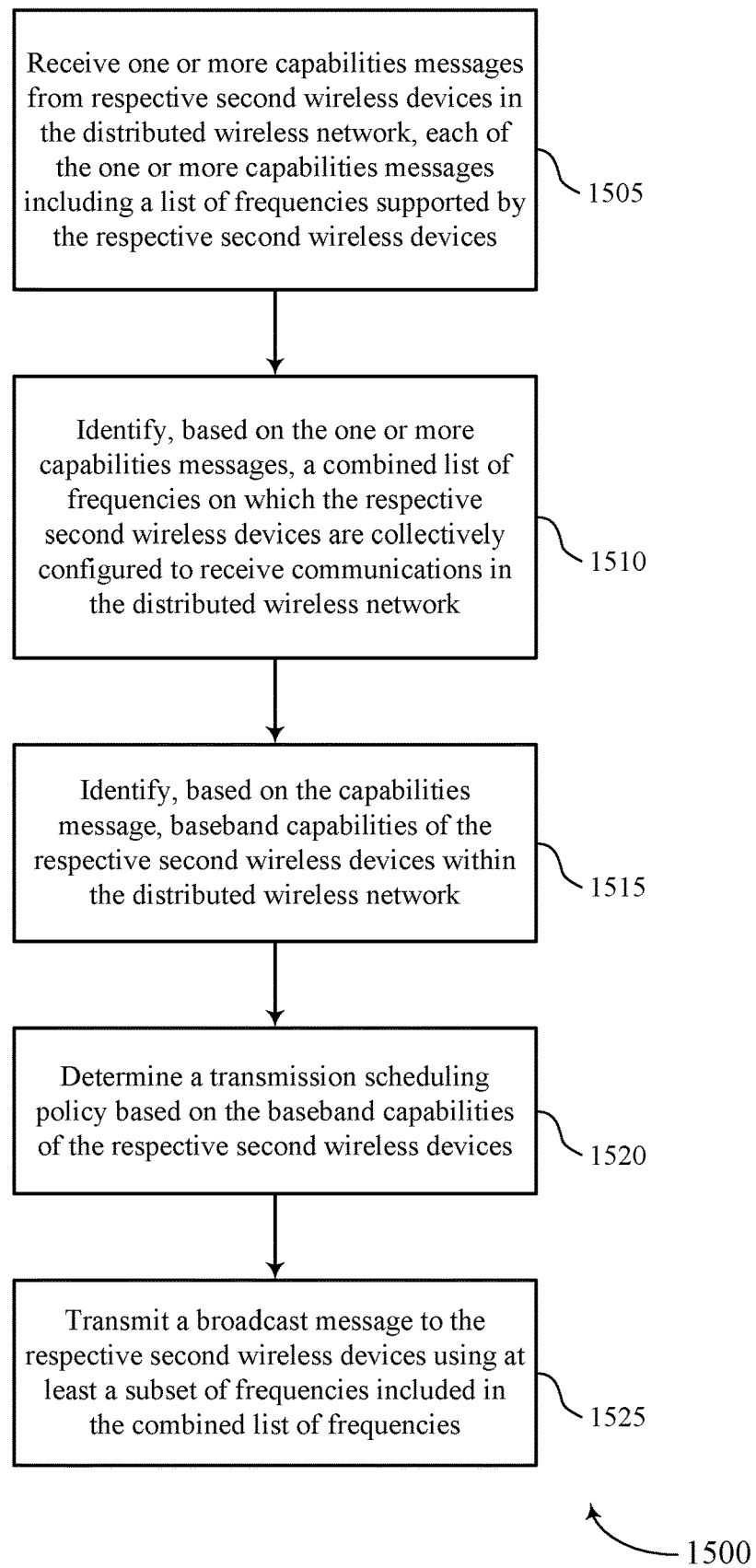

FIG. 15 shows a flowchart illustrating a method 1500 for responding UE techniques for capability discovery in distributed wireless networks in accordance with one or more aspects of the present disclosure. The operations of method 1500 may be implemented by a UE 115 or its components as described herein. For example, the operations of method 1500 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may receive one or more capabilities messages from respective second wireless devices in the distributed wireless network, each of the one or more capabilities messages including a list of frequencies supported by the respective second wireless devices. The operations of block 1505 may be performed according to the methods described herein. In certain examples, aspects of the operations of block 1505 may be performed by capabilities message manager 415, 545, 640, or 715 as described with reference to FIGS. 4 through 7.

At block 1510, the UE 115 may identify, based at least in part on the one or more capabilities messages, a combined list of frequencies on which the respective second wireless devices are collectively configured to receive communications in the distributed wireless network. The operations of block 1510 may be performed according to the methods described herein. In certain examples, aspects of the operations of block 1510 may be performed by RF capabilities manager 415, 530, 625, or 715 as described with reference to FIGS. 4 through 7.

At block 1515, the UE 115 may identify, based at least in part on the capabilities message, baseband capabilities of the respective second wireless devices within the distributed wireless network. The operations of block 1515 may be performed according to the methods described herein. In certain examples, aspects of the operations of block 1515 may be performed by baseband capabilities manager 415, 540, 635, or 715 as described with reference to FIGS. 4 through 7.

At block 1520, the UE 115 may determine a transmission scheduling policy based at least in part on the baseband capabilities of the respective second wireless devices. The operations of block 1520 may be performed according to the methods described herein. In certain examples, aspects of the operations of block 1520 may be performed by transmission scheduling manager 415, 535, 630, or 715 as described with reference to FIGS. 4 through 7.

At block 1525, the UE 115 may transmit a broadcast message to the respective second wireless devices using at least a subset of frequencies included in the combined list of frequencies. The operations of block 1525 may be performed according to the methods described herein. In certain examples, aspects of the operations of block 1525 may be performed by transmitter 420, 520, or 735 as described with reference to FIGS. 4, 5, and 7.

Figure 16:
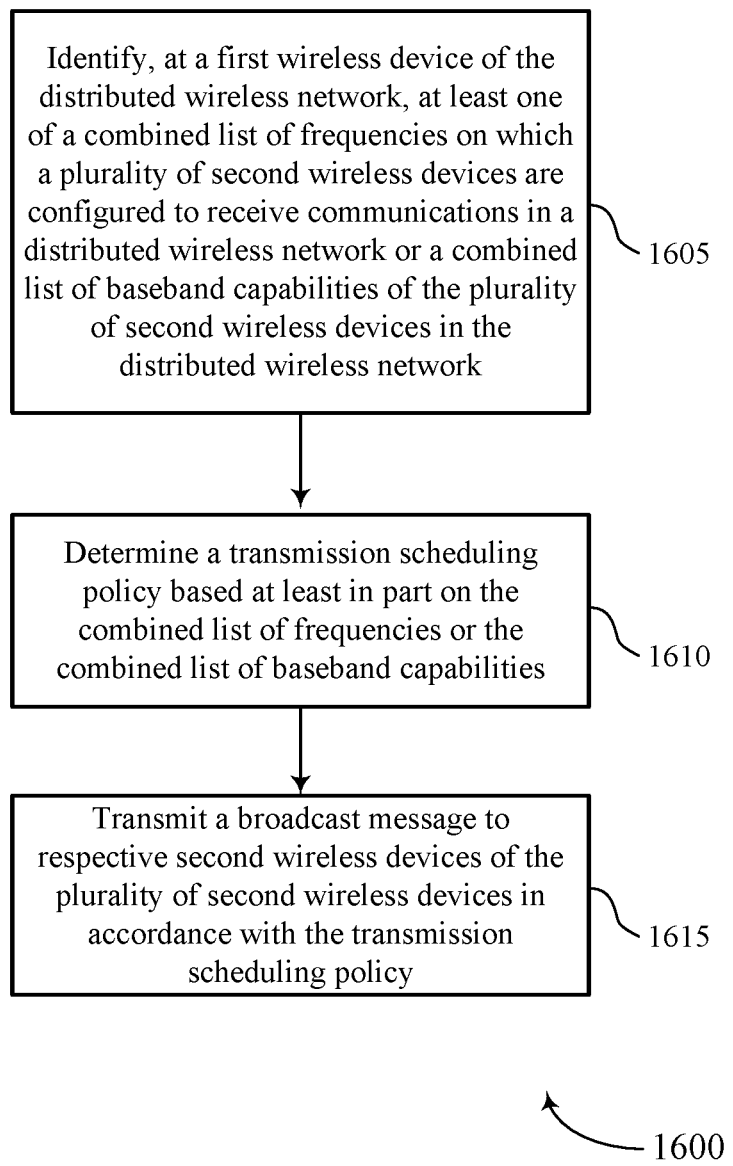

FIG. 16 shows a flowchart illustrating a method 1600 for responding UE techniques for capability discovery in distributed wireless networks in accordance with one or more aspects of the present disclosure. The operations of method 1600 may be implemented by a UE 115 or its components as described herein. For example, the operations of method 1600 may be performed by communications manager 415, 515, 615, or 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may identify at least one of a combined list of frequencies on which a plurality of second wireless devices are configured to receive communications in the distributed wireless network or a combined list of baseband capabilities of the plurality of second wireless devices in the distributed wireless network. The operations of block 1605 may be performed according to the methods described herein. In certain examples, aspects of the operations of block 1605 may be performed by RF capabilities manager 415, 530, 625, or 715 as described with reference to FIGS. 4 through 7.

At block 1610, the UE 115 may determine a transmission scheduling policy based at least in part on the combined list of frequencies or the combined list of baseband capabilities. The operations of block 1610 may be performed according to the methods described herein. In certain examples, aspects of the operations of block 1610 may be performed by transmission scheduling manager 415, 535, 630, or 715 as described with reference to FIGS. 4 through 7.

At block 1615, the UE 115 may transmit a broadcast message to respective second wireless devices of the plurality of second wireless devices in accordance with the transmission scheduling policy. The operations of block 1615 may be performed according to the methods described herein. In certain examples, aspects of the operations of block 1615 may be performed by transmitter 420, 520, or 735 as described with reference to FIGS. 4, 5 and 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a distributed wireless network, comprising:
   generating, at a first user equipment (UE) in the distributed wireless network, a capabilities message with a list of frequencies and a list of baseband capabilities supported by the first UE, the list of baseband capabilities comprising a block coding scheme;
   transmitting the capabilities message to one or more second UEs of the distributed wireless network; and
   receiving, at the first UE, a broadcast message from at least one UE of the one or more second UEs based at least in part on the transmitted capabilities message.

2. The method of claim 1, further comprising:
   generating a bitmap of the list of frequencies based at least in part on frequency capabilities of the first UE; and
   generating the capabilities message based at least in part on the bitmap.

3. The method of claim 1, wherein the list of frequencies includes frequencies on which the first UE is configured to simultaneously support receipt of communications in the distributed wireless network.

4. The method of claim 1, wherein the list of frequencies includes frequencies on which the first UE is listening for communications in the distributed wireless network.

5. The method of claim 1, wherein the capabilities message is transmitted via a sidelink control information (SCI) message and a modulation and coding scheme (MCS) used in relation to the SCI message varies based on a size of the SCI message.

6. The method of claim 1, wherein the capabilities message is transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof.

7. The method of claim 1, wherein generating the capabilities message further comprises:
   encoding the capabilities message with baseband capabilities supported by the first UE; and
   receiving the broadcast message from the at least one UE of the one or more second UEs based at least in part on the baseband capabilities.

8. The method of claim 7, wherein the block coding scheme is a space time block code (STBC) scheme or a space frequency block code (SFBC) scheme.

9. The method of claim 1, wherein generating the capabilities message further comprises:
   including an indication of whether frequency capabilities information or baseband capabilities information of the first UE, as included in the capabilities message, is static or dynamic.

10. The method of claim 1, wherein the capabilities message is transmitted periodically.

11. The method of claim 1, wherein the distributed wireless network supports vehicle-to-everything (V2X) communications, public safety device-to-device (D2D) communications, peer-to-peer (P2P) communications, or combinations thereof.

12. A method for wireless communication in a distributed wireless network, comprising:
   identifying, at a first user equipment (UE) of the distributed wireless network, a combined list of frequencies on which a plurality of second UEs are configured to receive communications in the distributed wireless network and a combined list of baseband capabilities of the plurality of second UEs in the distributed wireless network, the combined list of baseband capabilities comprising a block coding scheme;
   determining a transmission scheduling policy for transmitting a broadcast message based at least in part on the combined list of frequencies and the combined list of baseband capabilities; and
   transmitting, by the first UE, the broadcast message to respective second UEs of the plurality of second UEs in accordance with the transmission scheduling policy.

13. The method of claim 12, wherein identifying at least one of the combined list of frequencies or the combined list of baseband capabilities of the plurality of second UEs in the distributed wireless network comprises:
   receiving one or more capabilities messages from the respective second UEs of the plurality of second UEs; and
   generating at least one of the combined list of frequencies based at least in part on individual lists of frequencies included in the one or more capabilities messages or the combined list of baseband capabilities based at least in part on individual lists of baseband capabilities included in the one or more capabilities messages, each individual list of frequencies identifying frequencies on which the respective second UEs are configured to receive communications in the distributed wireless network and each individual list of baseband capabilities identifying baseband capabilities of the respective second UEs.

14. The method of claim 12, wherein determining the transmission scheduling policy further comprises:
determining that a majority of neighboring second UEs of the plurality of second UEs are configured to listen to only a single frequency band; and
distributing transmissions based at least in part on a bias for the single frequency band.

15. The method of claim 12, wherein determining the transmission scheduling policy further comprises:
determining that a threshold percentage of neighboring respective second UEs of the plurality of second UEs have block decoding baseband capabilities; and
enabling the block coding scheme for transmissions on frequencies that are supported by the threshold percentage of neighboring respective second UEs, wherein the block coding scheme includes a space time block code (STBC) scheme or a space frequency block code (SFBC) scheme.

16. The method of claim 12, wherein determining the transmission scheduling policy further comprises:
determining that a majority of neighboring second UEs of the plurality of second UEs are configured to listen to a limited number of frequency bands; and
distributing transmissions based at least in part on a bias for frequency bands of the limited number of frequency bands that are most commonly used by the neighboring second UEs.

17. The method of claim 12, wherein determining the transmission scheduling policy further comprises:
determining a primary frequency, a carrier aggregation scheme, or some combination thereof based at least in part on the combined list of frequencies; and
determining the transmission scheduling policy based at least in part on the primary frequency, the carrier aggregation scheme, or some combination thereof.

18. The method of claim 12, wherein the distributed wireless network supports vehicle-to-everything (V2X) communications, public safety device-to-device (D2D) communications, peer-to-peer (P2P) communications, or combinations thereof.

19. A method for wireless communication in a distributed wireless network, comprising:
receiving, at a first user equipment (UE) in the distributed wireless network, one or more capabilities messages from respective second UEs in the distributed wireless network, each of the one or more capabilities messages including a list of frequencies and a list of baseband capabilities supported by the respective second UEs, the list of baseband capabilities comprising a block coding scheme;
identifying, based at least in part on the one or more capabilities messages, a combined list of frequencies on which the respective second UEs are collectively configured to receive communications in the distributed wireless network and a combined list of baseband capabilities that are collectively supported by the second UEs on the combined list of frequencies; and
transmitting, by the first UE, a broadcast message to the respective second UEs using at least a subset of frequencies included in the combined list of frequencies and at least one baseband capability included in the combined list of baseband capabilities.

20. The method of claim 19, wherein identifying the combined list of frequencies on which the respective second UEs are collectively configured to receive communications in the distributed wireless network comprises:
identifying the combined list of frequencies via a bitmap included in each of the one or more capabilities messages.

21. The method of claim 19, wherein the combined list of frequencies includes at least one of a plurality of frequencies on which the respective second UEs are configured to simultaneously support receipt of communications in the distributed wireless network or a plurality of frequencies on which the respective second UEs are listening for communications in the distributed wireless network.

22. The method of claim 19, further comprising:
identifying, based at least in part on the one or more capabilities messages, a list of frequencies on which the respective second UEs are configured to transmit communications in the distributed wireless network.

23. The method of claim 19, wherein receiving the one or more capabilities messages from the respective second UEs comprises:
receiving the one or more capabilities messages via a sidelink control information (SCI) message, and
wherein a modulation and coding scheme (MCS) used in relation to the SCI message varies based on a size of the SCI message.

24. The method of claim 19, wherein receiving the one or more capabilities messages from the respective second UEs comprises:
receiving the one or more capabilities messages via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof.

25. The method of claim 19, wherein the one or more capabilities messages include an indication of whether frequency capabilities information or baseband capabilities information of the respective second UEs, as included in the one or more capabilities message, is static or dynamic.

26. The method of claim 19, further comprising:
determining a transmission scheduling policy based at least in part on the combined list of frequencies; and
transmitting the broadcast message to the respective second UEs in accordance with the transmission scheduling policy.

27. The method of claim 26, wherein determining the transmission scheduling policy further comprises:
determining that a majority of neighboring respective second UEs in the distributed wireless network are configured to listen to only a single frequency band or a limited number of frequency bands; and
distributing transmissions based at least in part on a bias for the single frequency band or a bias for frequency bands of the limited number of frequency bands that are most commonly used by the neighboring respective second UEs.

28. The method of claim 26, wherein determining the transmission scheduling policy further comprises:
determining a primary frequency, a carrier aggregation scheme, or some combination thereof based at least in part on the one or more capabilities messages; and
determining the transmission scheduling policy based at least in part on the primary frequency, the carrier aggregation scheme, or some combination thereof.

29. The method of claim 19, further comprising:
identifying, based at least in part on the capabilities message, baseband capabilities of the respective second UEs within the distributed wireless network; and
determining a transmission scheduling policy based at least in part on the baseband capabilities of the respective second UEs.

30. An apparatus for wireless communication, comprising:
a processor;
memory coupled with the processor; and
instructions stored in the memory and operable, when executed by the processor, to cause the apparatus to:
generate, at a first UE associated with the apparatus in a distributed wireless network, a capabilities message with a list of frequencies and a list of baseband capabilities supported by the first UE, the list of baseband capabilities comprising a block coding scheme;
transmit the capabilities message to one or more second UEs of the distributed wireless network; and
receive a broadcast message from at least one of the one or more second UEs based at least in part on the transmitted capabilities message and one or more second capabilities messages transmitted by the one or more second UEs.

* * * * *